(12) United States Patent
Nishiyama et al.

(10) Patent No.: US 9,712,755 B2
(45) Date of Patent: Jul. 18, 2017

(54) INFORMATION PROCESSING METHOD, APPARATUS, AND PROGRAM FOR CORRECTING LIGHT FIELD DATA

(71) Applicant: CANON KABUSHIKI KAISHA, Tokyo (JP)

(72) Inventors: Tomohiro Nishiyama, Kawasaki (JP); Kazuhiro Yoshimura, Kawasaki (JP); Yuichi Nakada, Yokohama (JP); Satoru Torii, Fuchu (JP); Masato Ogawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/403,531

(22) PCT Filed: May 22, 2013

(86) PCT No.: PCT/JP2013/064959
§ 371 (c)(1),
(2) Date: Nov. 24, 2014

(87) PCT Pub. No.: WO2013/180192
PCT Pub. Date: Dec. 5, 2013

(65) Prior Publication Data
US 2015/0130995 A1 May 14, 2015

(30) Foreign Application Priority Data

May 31, 2012 (JP) .................................. 2012-124985
Mar. 6, 2013 (JP) .................................. 2013-044407

(51) Int. Cl.
*H04N 5/235* (2006.01)
*G06T 5/00* (2006.01)
*G06T 5/50* (2006.01)

(52) U.S. Cl.
CPC ........... *H04N 5/2354* (2013.01); *G06T 5/003* (2013.01); *G06T 5/50* (2013.01); *G06T 2200/21* (2013.01)

(58) Field of Classification Search
CPC ......... H04N 5/2354; G06T 5/003; G06T 5/50; G06T 2200/21
(Continued)

(56) References Cited

U.S. PATENT DOCUMENTS 6,359,649 B1 * 3/2002 Suzuki ................... H04N 5/225
348/220.1
2008/0186308 A1 * 8/2008 Suzuki ............... H04N 13/0497
345/419
(Continued)

FOREIGN PATENT DOCUMENTS

JP 2008-219878 A 9/2008
JP 2008-294741 A 12/2008
(Continued)

OTHER PUBLICATIONS

Ren NG, Marc Levoy, Mathieu Brédif, Gene Duval, Mark Horowitz, Pat Hanrahan, Light Field Photography with a Hand-held Plenoptic Camera, Stanford Tech Report CTSR Feb. 2005, Stanford Computer Graphics Lab, Stanford, CA, 2005.

*Primary Examiner* — Amandeep Saini
(74) *Attorney, Agent, or Firm* — Canon USA, Inc. IP Division

(57) ABSTRACT

An object of the present invention is to realize novel information processing which uses light field data. To attain the object, light field data which represents directions of light beams which are emitted from an object to an image pickup unit and intensity of the light beams is obtained, and the light field data is corrected on a coordinate of the light field data.

19 Claims, 40 Drawing Sheets

(58) Field of Classification Search
USPC .......................................................... 382/154
See application file for complete search history.

(56) References Cited

U.S. PATENT DOCUMENTS

| | | | | |
|---|---|---|---|---|
| 2009/0274362 | A1* | 11/2009 | Sasakawa | ............ B60W 40/072 |
| | | | | 382/154 |
| 2010/0066854 | A1* | 3/2010 | Mather | .................. G02B 5/005 |
| | | | | 348/222.1 |
| 2013/0286237 | A1* | 10/2013 | Samadan | ............... H04N 9/045 |
| | | | | 348/222.1 |

FOREIGN PATENT DOCUMENTS

| | | | |
|---|---|---|---|
| JP | 2011-135170 A | 7/2011 | |
| JP | WO 2013069292 A1 * | 5/2013 | ........... H04N 5/2254 |
| WO | 2010/120591 A | 10/2010 | |
| WO | WO 2013069292 A1 * | 5/2013 | ........... H04N 5/2254 |

* cited by examiner

FIG. 4A
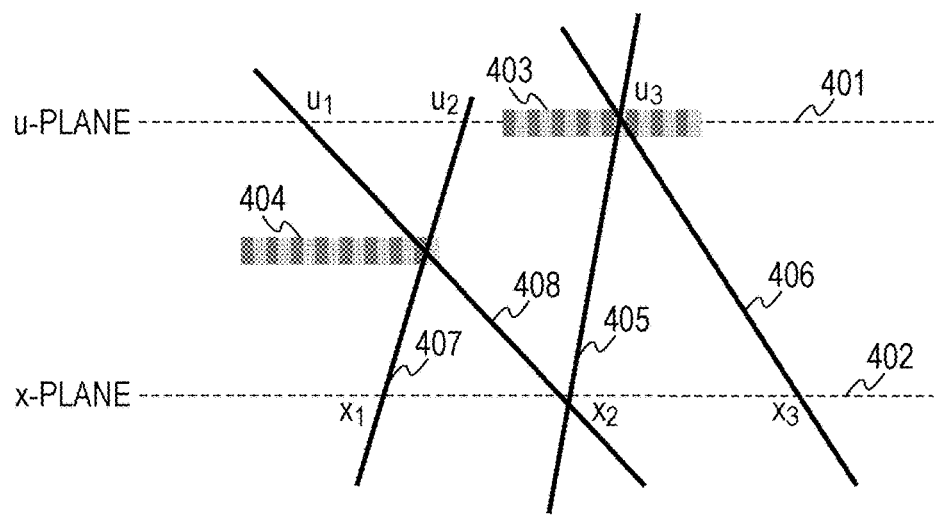
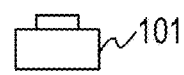
FIG. 4B
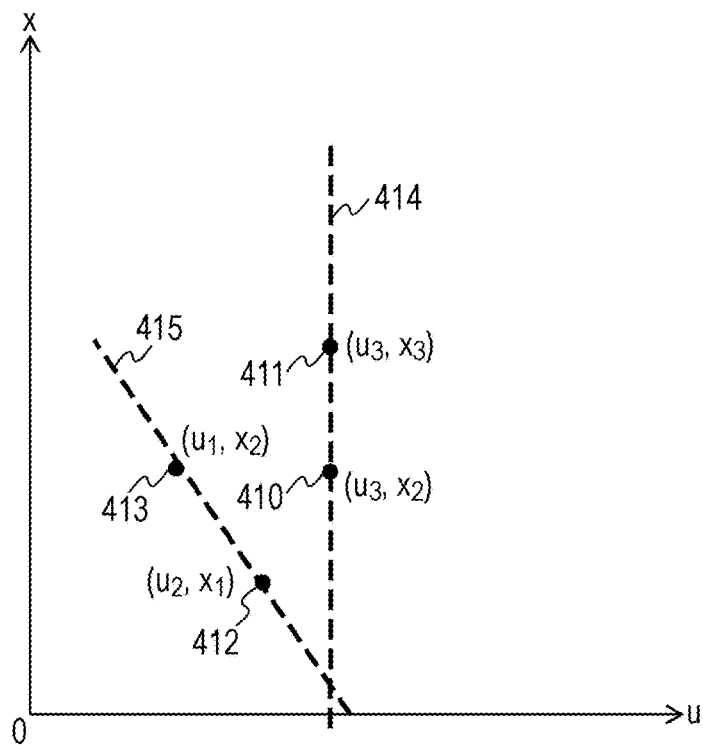

FIG. 25
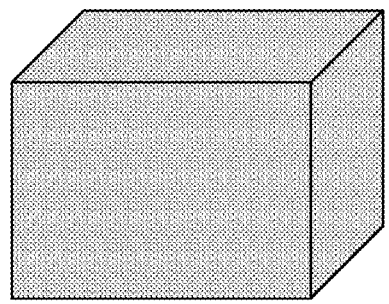
OBJECT
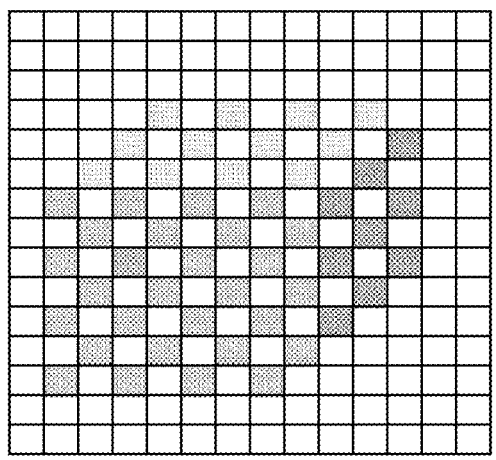
CAPTURED IMAGE DATA
(ONLY G PLANE)
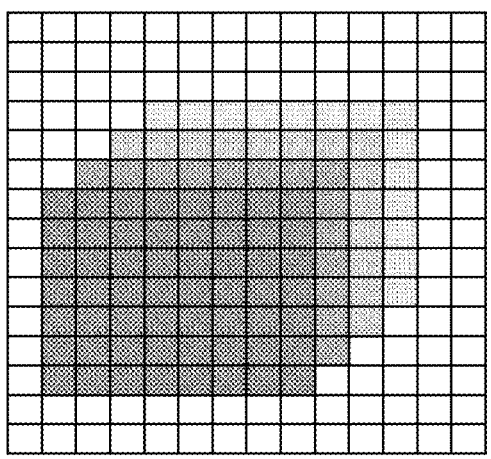
DISTANCE DATA FIG. 26
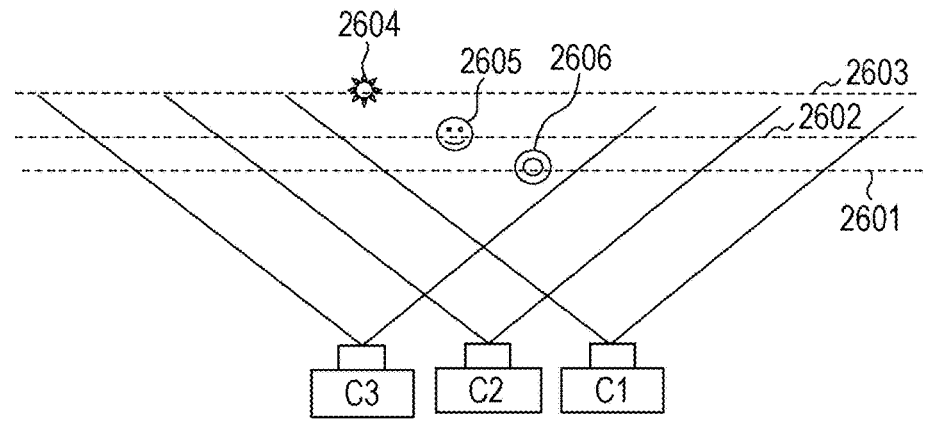
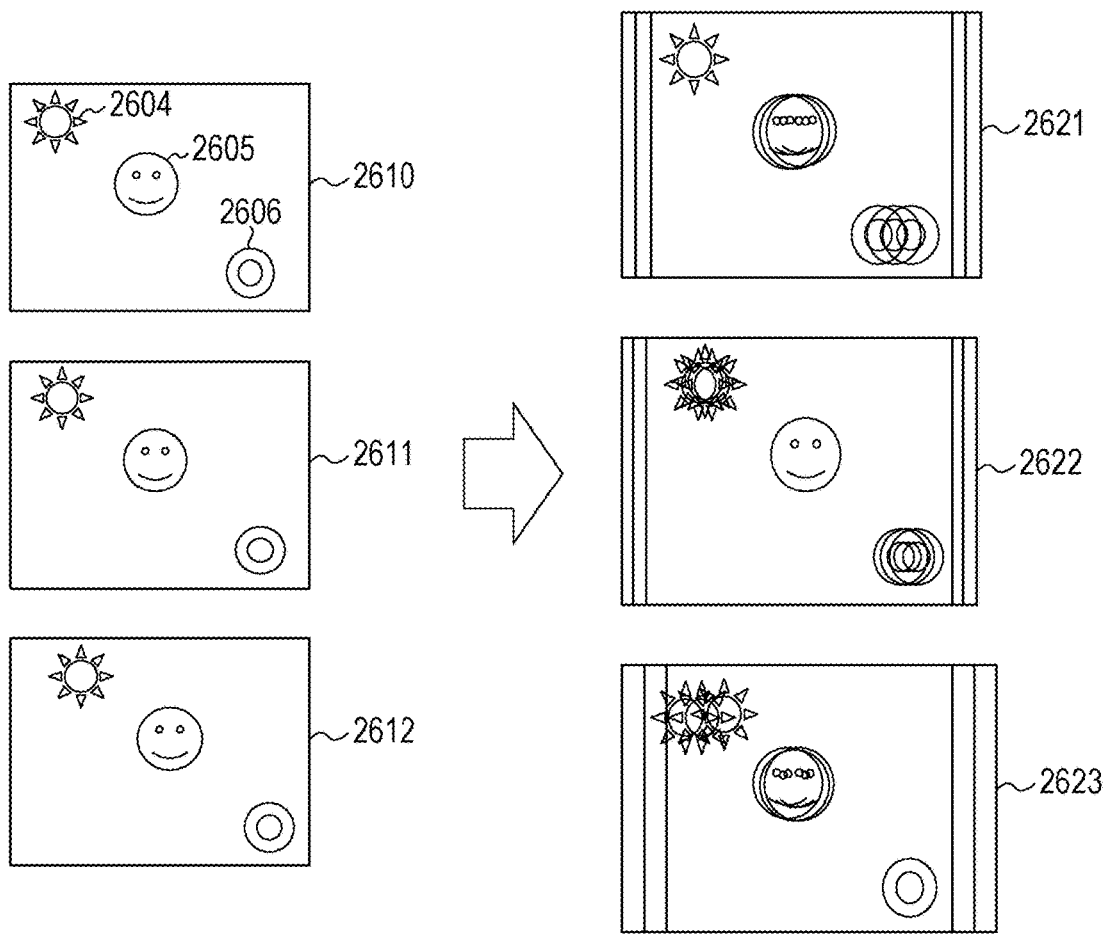

FIG. 28
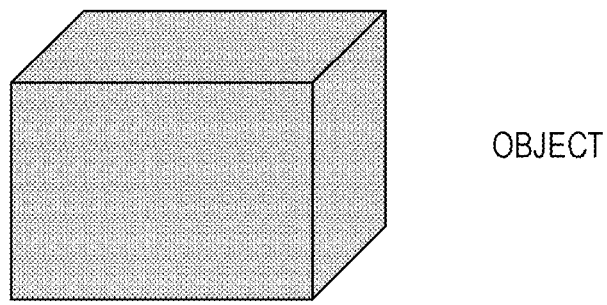
OBJECT
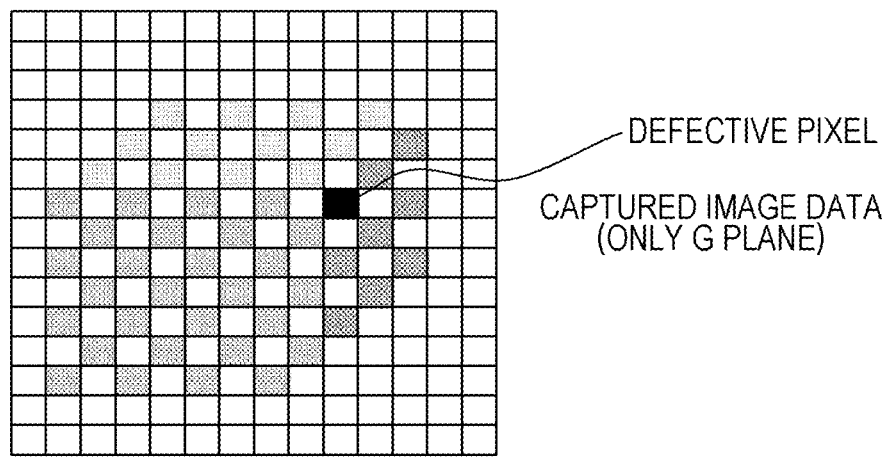
DEFECTIVE PIXEL
CAPTURED IMAGE DATA
(ONLY G PLANE)
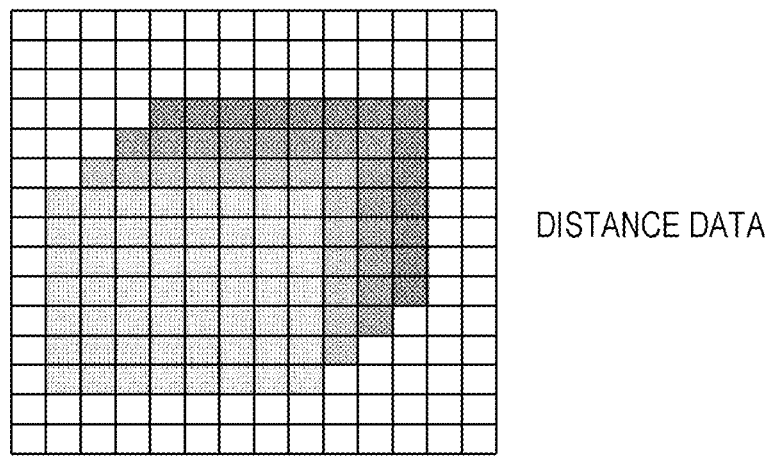
DISTANCE DATA

| | SUB-LF DATA | | | | |
|---|---|---|---|---|---|
| | 1 | 2 | 3 | | n |
| CORRESPONDING POINT 1: | $(u_1^1, x_1^1)$ | $(u_2^1, x_2^1)$ | $(u_3^1, x_3^1)$ | ······ | $(u_n^1, x_n^1)$ |
| CORRESPONDING POINT 2: | $(u_1^2, x_1^2)$ | $(u_2^2, x_2^2)$ | $(u_3^2, x_3^2)$ | ······ | $(u_n^2, x_n^2)$ |
| CORRESPONDING POINT 3: | $(u_1^3, x_1^3)$ | $(u_2^3, x_2^3)$ | $(u_3^3, x_3^3)$ | ······ | $(u_n^3, x_n^3)$ |
| CORRESPONDING POINT 4: | $(u_1^4, x_1^4)$ | $(u_2^4, x_2^4)$ | $(u_3^4, x_3^4)$ | ······ | $(u_n^4, x_n^4)$ |
| ⋮ | ⋮ | ⋮ | ⋮ | | ⋮ |
| CORRESPONDING POINT m: | $(u_1^m, x_1^m)$ | $(u_2^m, x_2^m)$ | $(u_3^m, x_3^m)$ | ······ | $(u_n^m, x_n^m)$ |

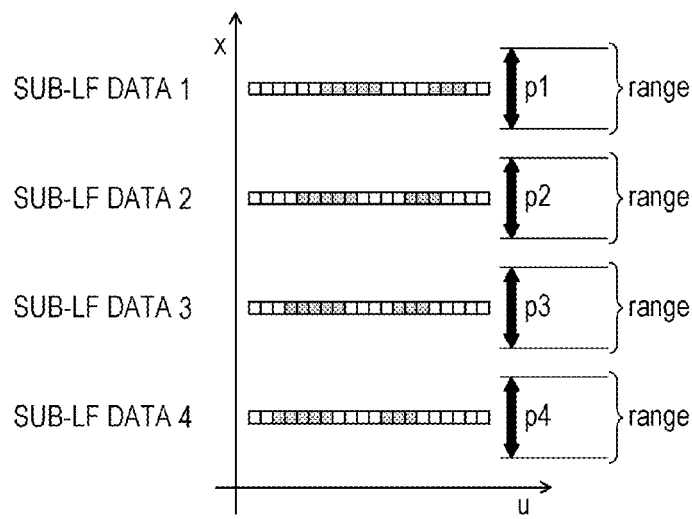

INFORMATION PROCESSING METHOD, APPARATUS, AND PROGRAM FOR CORRECTING LIGHT FIELD DATA

TECHNICAL FIELD

The present invention relates to information processing using light field data including information on directions and intensity of light beams.

BACKGROUND ART

In recent years, a technique referred to as computational photography has been proposed which generates image data in accordance with information on directions and intensity of light beams (hereinafter referred to as "light field data") (refer to NPL 1).

With this technique, image data which has been subjected to focus adjustment may be generated after image capturing, and therefore, even if focus adjustment fails at a time of image capturing, the focus adjustment may be performed in image processing.

In the computational photography in the related art, functions and use thereof are limited.

CITATION LIST

Non Patent Literature

NPL 1 R. N G, M. Levoy, M. Bredif, G. Duval, M. Horowitz, P. Hanrahan, "Light Field Photography with a Hand-held Plenoptic Camera" (Stanford Tech Report CTSR 2005-02, 2005)

SUMMARY OF INVENTION

The present invention provides novel information processing different from the computational photography in the related art.

Accordingly, an information processing apparatus according to the present invention includes obtaining means for obtaining light field data representing directions and intensity of light beams emitted from an object to an image pickup unit and correction means for correcting the light field data on a coordinate of the light field data.

Further features of the present invention will become apparent from the following description of exemplary embodiments with reference to the attached drawings.

BRIEF DESCRIPTION OF DRAWINGS

FIGS. 4A and 4B are diagrams illustrating the relationship between light beams and a light field coordinate included in light field data.

FIG. 25 is a diagram illustrating captured-image data and distance data according to the sixth and seventh embodiments.

FIG. 26 is a diagram illustrating a problem which arises when a synthetic image is generated according to the seventh embodiment.

FIG. 28 is a diagram illustrating captured-image data and distance data according to the eighth embodiment.

FIGS. 35A and 35B are diagrams schematically illustrating LF correction parameters and a diagram illustrating a state in which the LF correction parameters are added to the data group obtained as a result of the corresponding-point searching according to the tenth embodiment.

DESCRIPTION OF EMBODIMENTS

First Embodiment

Background of First Embodiment

In a first embodiment, a blur correction process (blur reduction process) will be described as novel information processing using light field data.

A blur correction process has been performed to realize high-quality images. In general, a blur is generated by a shift of an optical axis of an image pickup device during exposure, a movement of an object, or the like. As the blur correction process, a process of optically or mechanically reducing a blur and a process of reducing a blur through image processing have been known. In the process of optically or mechanically correcting a blur, an optical or mechanical module for correcting a blur is required to be disposed in an image pickup device.

As an example of the process of correcting a blur through image processing, a method for correcting a blur by performing deconvolution using a filter on influence caused by a blur (that is, by operating an inverse filter) in image data has been proposed. However, the following problems arise in the blur correction through the image processing in the related art.

For example, when a blur is generated due to a shift of the image pickup device in a direction orthogonal to the optical axis, amounts of blurs of objects in an image are different from one another depending on distances from the image pickup device to the objects. Specifically, an object located far from the image pickup device has a small amount of blur in the image whereas an object located near the image pickup device has a large amount of blur. Therefore, a filter used for deconvolution should be changed in accordance with a distance, and information on a distance to an object is required. However, it is difficult for normal image pickup devices to obtain information on a distance to an object, and in addition, even if information on a distance to an object is obtained, artifacts are generated in a region in which the distance is changed.

According to this embodiment, light field data is corrected on a light field coordinate (a light field space) so that a blur correction process is realized at high accuracy as will be described hereinafter.

Hardware Configuration

Figure 1A:
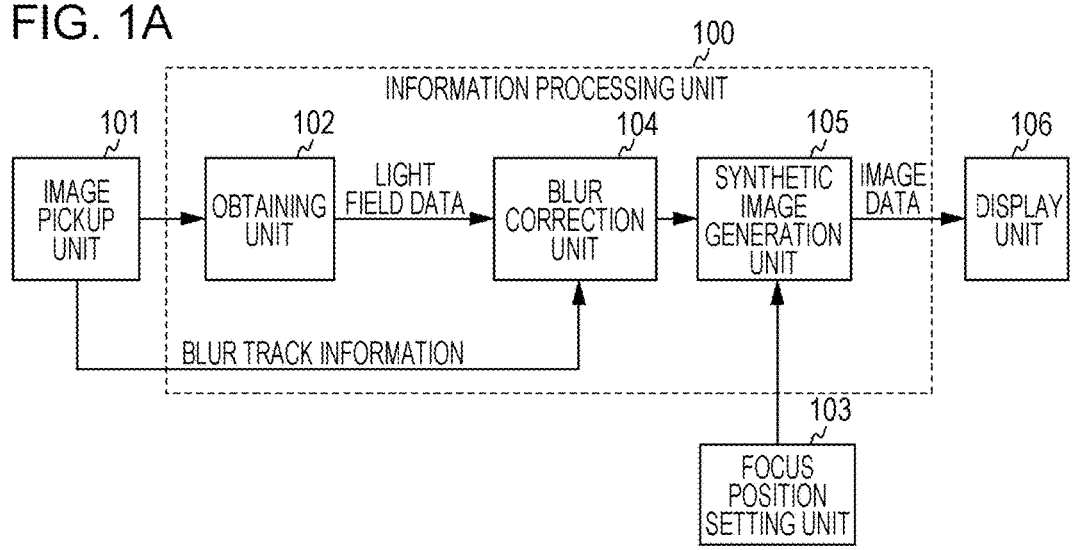
FIGS. 1A and 1B are diagrams illustrating main components of an information processing system according to a first embodiment.

FIG. 1A is a diagram illustrating main components of an information processing system according to this embodiment.

An image pickup unit 101 includes a plurality of lenses and image pickup elements such as a CMOS sensor or a CCD sensor and obtains data (hereinafter referred to as "light field data") representing directions and intensity of light beams emitted from an object. Note that, in this embodiment, as the image pickup unit 101, a camera (Plenoptic camera) including a microlens array for obtaining light field data disposed between a main lens and the image pickup elements will be described. A configuration of the Plenoptic camera is shown in FIGS. 2A and 2B.

Figure 2A:
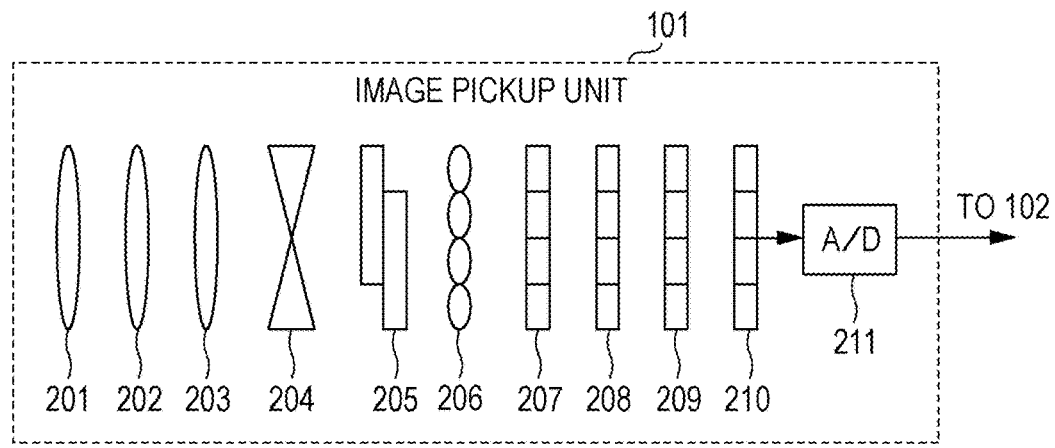
FIGS. 2A and 2B are diagrams illustrating an internal configuration of an image pickup unit.

FIG. 2A is a diagram illustrating an internal configuration of the image pickup unit 101. The image pickup unit 101 includes image pickup lenses 201 to 203, an aperture stop (hereinafter simply referred to as an "aperture") 204, a shutter 205, a microlens array 206 for obtaining light field data, an optical low-pass filter 207, an iR cut filter 208, a color filter 209, a photoelectric conversion image pickup element 210, and an A/D converter 211. The image pickup lenses 201 to 203 are referred to as a zoom lens 201 and focus lenses 202 and 203. Quantity of light which is incident on the image pickup unit 101 may be controlled by controlling the aperture 204. The microlens array 206 for obtaining light field data is different from a microlens for collecting light which is disposed in front of the photoelectric conversion image pickup element 210. In a general microlens for collecting light, a single optical system (a convex lens, for example) is disposed in each pixel of an image pickup element as a one-to-one relationship. However, in a microlens array for obtaining light field data, a single optical system is disposed for a plurality of pixels (for example, a single optical system is disposed for 16 pixels). Note that, even if sizes of lenses of the microlens array 206 for obtaining light field data are several micrometers or several millimeters, the lenses are still referred to as "microlenses" irrespective of the sizes of the lenses.

Obtainment of Light Field Data

Figure 2B:
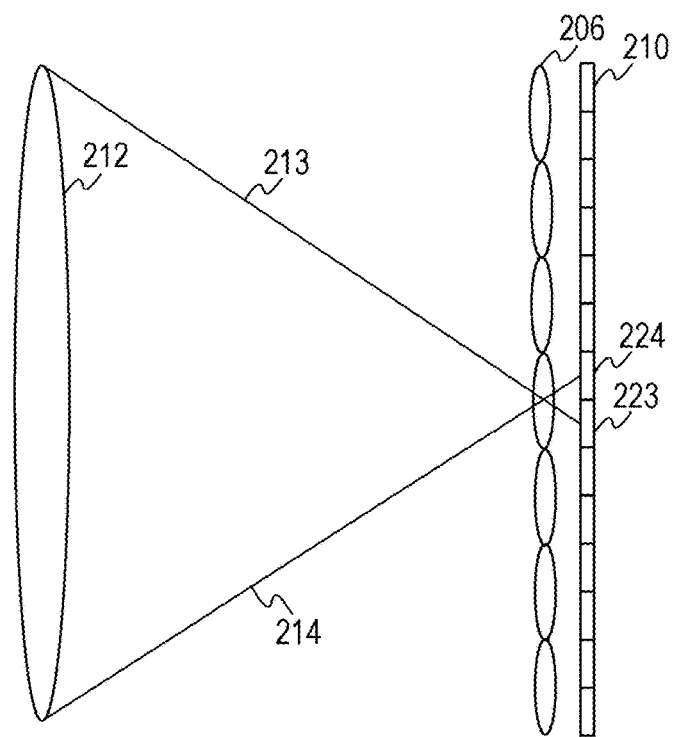

FIG. 2B is a diagram schematically illustrating the microlens array 206 for obtaining light field data.

The zoom lens 201 and the focus lenses 202 and 203 are schematically represented as a single main lens 212 in a collective manner. Light beams 213 and 214 which enter from the main lens 212 encounter the photoelectric conversion image pickup element 210 through the microlens array 206 for obtaining light field data. In the Plenoptic camera, since the microlens array 206 is used, incoming directions of the light beams 213 and 214 which are incident on the main lens 212 may be distinguished and light field data may be obtained. For example, in a case of FIG. 2B, the light beam 213 which passes an upper half of the main lens 212 is received by a pixel 223 and the light beam 214 which passes a lower half is received by a pixel 224. In this way, the directions of the light beams 213 and 214 may be distinguished.

The image pickup unit 101 may be a multiple camera including a plurality of small cameras which are aligned, instead of the Plenoptic camera illustrated in FIGS. 2A and 2B. Any camera may be used as long as the camera may obtain light field data. In the following description, the image pickup unit 101 which obtains light field data which enables high direction analysis capability is used. The light field data which enables high direction analysis capability may be obtained by converting light field data discretely obtained (data which does not include detailed angles) into consecutive data (data which include detailed angles) through a correction process, for example.

An information processing unit 100 receives light field data from the image pickup unit 101, corrects the light field data, and generates image data in accordance with the corrected light field data.

An obtaining unit 102 obtains light field data from the image pickup unit 101.

A focus position setting unit 103 sets information representing a position of a focus plane and information on a depth of field of a synthetic image represented by synthetic image data in accordance with an instruction issued by a user. Images are synthesized such that objects within the depth of field come into focus in a synthetic image.

The focus position setting unit 103 may have a touch screen function, and in this case, a user's instruction input using a touch screen may be used as an input.

A blur correction unit 104 receives the light field data obtained by the obtaining unit 102, corrects a blur on the light field coordinate (in the light field space) which prescribes the light field data, and outputs the corrected light field data.

A synthetic image generation unit 105 generates synthetic image data in accordance with the information on the position of the focus plane and the information on the depth of field which are set by the focus position setting unit 103 and the light field data output from the blur correction unit 104.

A display unit 106 is a liquid crystal display, for example, and displays a synthetic image represented by the synthetic image data.

A difference between light field data and image data will now be described.

Figure 20A:
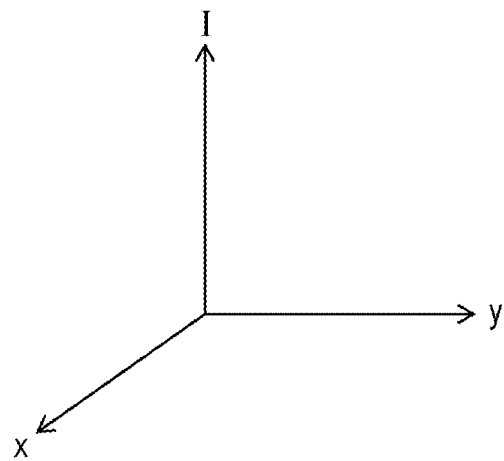
FIGS. 20A and 20B are diagrams illustrating a difference between an image data coordinate and a light field coordinate.
Figure 20B:
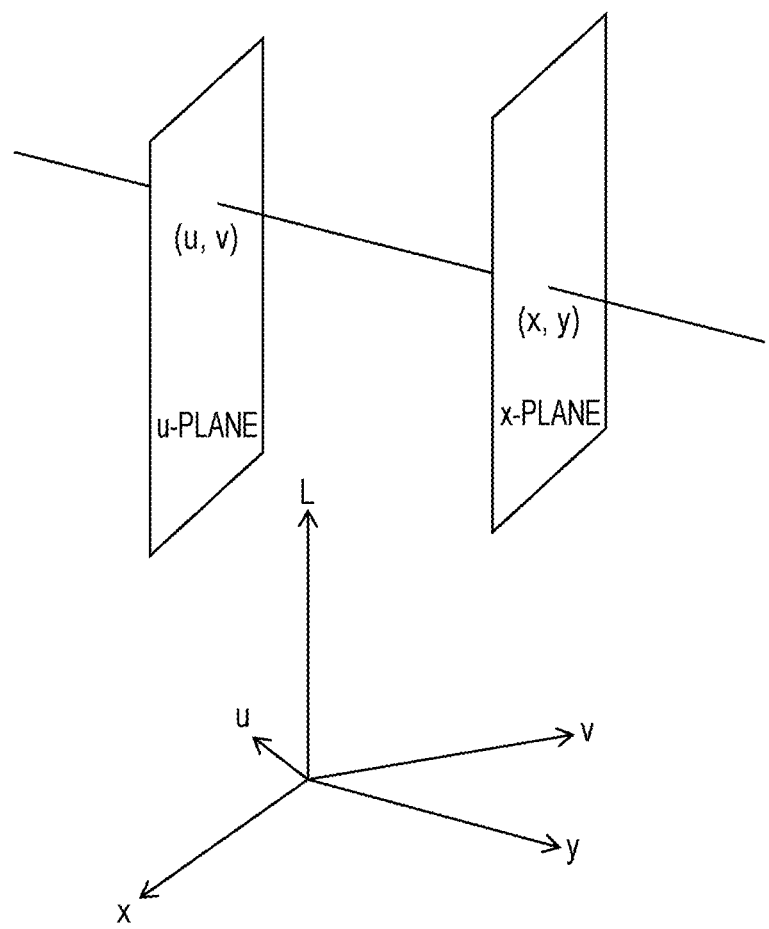

FIGS. 20A and 20B are diagrams illustrating a difference between an image data coordinate and a light field coordinate.

Image data is constituted by a group of data in which scalar values (pixel values I) correspond to points (x, y) in a two-dimensional plane. The image data coordinate which prescribes the image data is illustrated in FIG. 20A. In FIG. 20A, x, y, and I axes are coordinate axes (vectors) which form a three-dimensional space and which are independent from one another, and a single pixel value I(x, y) corresponds to a point (x, y).

On the other hand, light field data is constituted by a group of data in which a single scalar value corresponds to a single straight line in a three-dimensional space. In FIG. 20B, a single light beam (having an intensity of L) crosses two planes (u- and x-planes) at intersection points (u, v) and (x, y). A coordinate system which prescribes light field data corresponding to this light beam is illustrated in FIG. 20B. Although illustrated as a two-dimensional space for convenience sake, in FIG. 20B, x, y, u, v and L axes are coordinate axes (vectors) which form a five-dimensional space and which are independent from one another, and a single scalar value L(u, v, x, y) corresponds to a point (x, y, u, v). In this embodiment, the x, y, u, and v axes are referred to as a "light field coordinate".

Figure 1B:
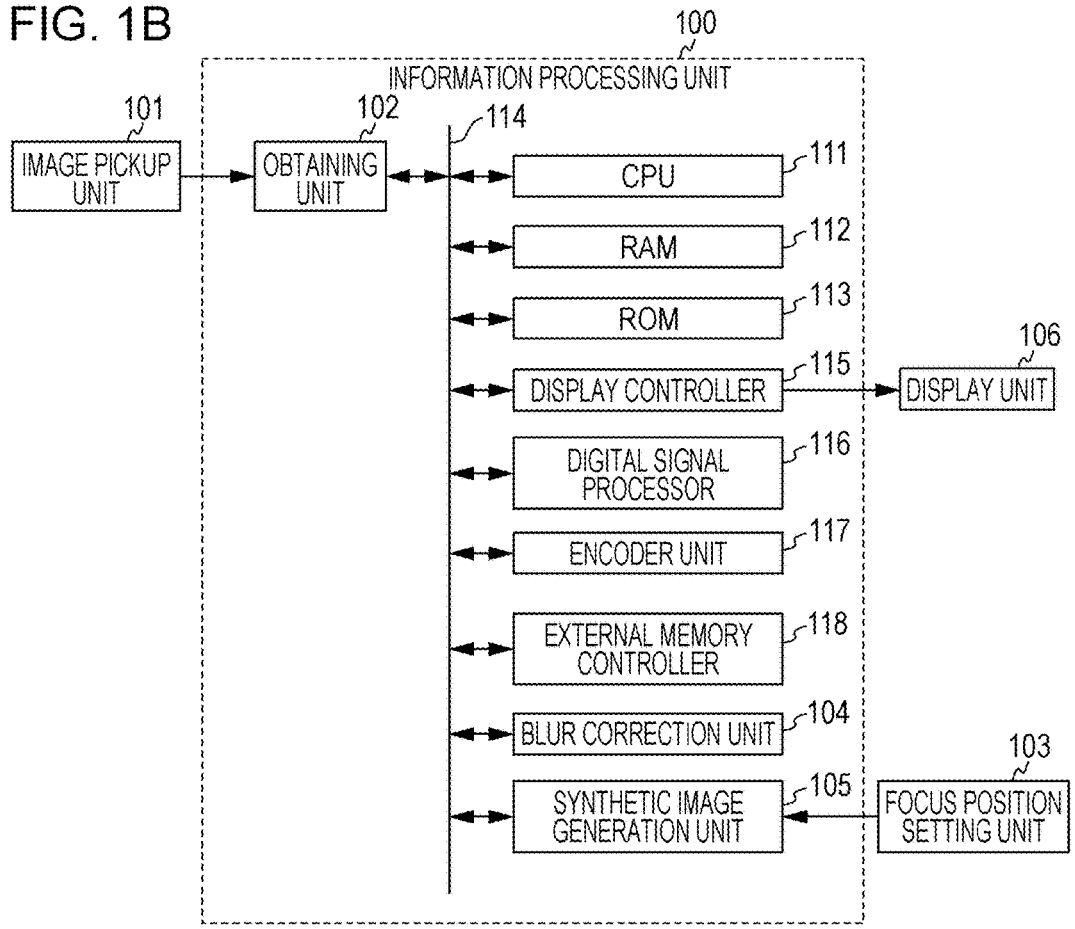

FIG. 1B is a diagram illustrating an internal configuration of the information processing unit 100 in detail.

A central processing unit (CPU) 111 integrally controls units described below. A RAM 112 functions as a main memory, a work area, or the like of the CPU 111. A ROM 113 stores control programs and the like executed by the CPU 111. A bus 114 serves as a transmission path for various data. Light field data obtained by the obtaining unit 102 is transmitted to a predetermined processing unit through the bus 114, for example. A display controller 115 performs display control on synthetic images and text displayed in the display unit 106. A digital signal processor 116 performs various processes including a white balance process, a gamma process, and a noise reduction process on synthetic image data received through the bus 114. An encoder unit 117 performs a conversion process on synthetic image data so as to obtain synthetic image data of a file format such as JPEG or MPEG. An external memory controller 118 is an interface used for connection to a PC or other media (such as a hard disk, a memory card, a CF card, an SD card, and a USB memory).

Configuration of Blur Correction Unit

Next, the blur correction unit 104 will be described in detail.

Figure 3:
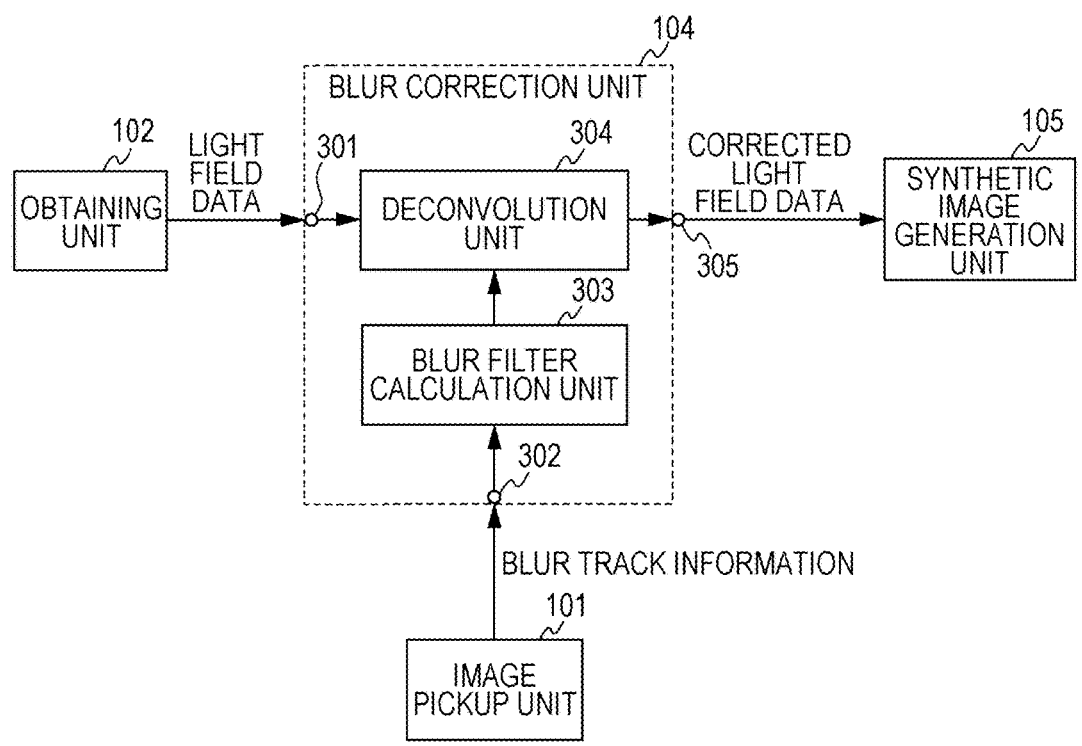
FIG. 3 is a diagram illustrating an internal configuration of a blur correction unit.

FIG. 3 is a diagram illustrating an internal configuration of the blur correction unit 104.

A blur is generated when information input during exposure is integrated. Examples of a blur include a blur caused by a shift of the image pickup unit 101 and a blur caused by a movement of an object. In this embodiment, it is assumed that a blur is generated due to a shift of the image pickup unit 101.

The blur correction unit 104 mainly includes a blur filter calculation unit 303 and a deconvolution unit 304. Hereinafter, the units will be described.

The blur filter calculation unit 303 calculates a blur filter in accordance with blur track information obtained from the image pickup unit 101. Here, the blur track information is obtained from the image pickup unit 101 including an orientation detector such as a Gyro sensor. A blur track is included in information representing a factor of influence given to an image represented by generated image data. The blur track information represents positions of the image pickup unit 101 at various time points, for example.

The deconvolution unit 304 performs deconvolution on light field data supplied from a light-field-data input terminal 301 using the blur filter calculated by the blur filter calculation unit 303.

A method for fabricating the blur filter and the deconvolution will be described in detail hereinafter.

Light Field Data

The light field data will be schematically described. Note that, for simplicity, a case where the image pickup unit 101 provided in a two-dimensional space obtains light field data is described hereinafter. However, the image pickup unit 101 is provided in a three-dimensional space in practice.

In FIG. 4A, the image pickup unit 101 in the two-dimensional space, objects 403 and 404, and light beams 405 to 408 which pass through the objects 403 and 404 are illustrated. In FIG. 4B, the light beams 405 to 408 of FIG. 4A are plotted on a light field coordinate.

Virtual planes 401 and 402 are virtually arranged in parallel in the two-dimensional space and are referred to as u- and x-planes, respectively. Although the u-plane 401 and the x-plane 402 are two-dimensional planes in practice, the u- and x-planes 401 and 402 are represented as one-dimensional planes in FIG. 4A.

In FIG. 4A, the objects 403 and 404 are located in the two-dimensional space, and a state in which the image pickup unit 101 obtains light field data in the space including the objects 403 and 404 is illustrated. The light beams 405 and 406 are emitted from the object 403. Assuming that a position in the u- and x-planes 401 and 402 through which a light beam passes are represented as a point (u, x), the light beam 405 passes a point $(u_3, x_2)$ and the light beam 406 passes a point $(u_3, x_3)$. When the points $(u_3, x_2)$ and $(u_3, x_3)$ are plotted on a light field coordinate having an axis of abscissa of u and an axis of ordinate of x, points 410 and 411 are obtained. Specifically, a single light beam corresponds to a single point on the light field coordinate.

The light beams 407 and 408 are emitted from the object 404 and pass points $(u_2, x_1)$ and $(u_1, x_2)$, respectively. When the points $(u_2, x_1)$ and $(u_1, x_2)$ are plotted on the light field coordinate, points 412 and 413 are obtained.

As is apparent from FIG. 4B, all light beams output from a certain point of an object are included in a single straight line on a light field coordinate. For example, all light beams output from a certain point of the object 403 are included in a straight line 414 and all light beams output from a certain point of the object 404 are included in a straight line 415. Furthermore, an inclination of a straight line on a light field coordinate varies depending on a distance from the u-plane 401 to an object.

Figure 5A:
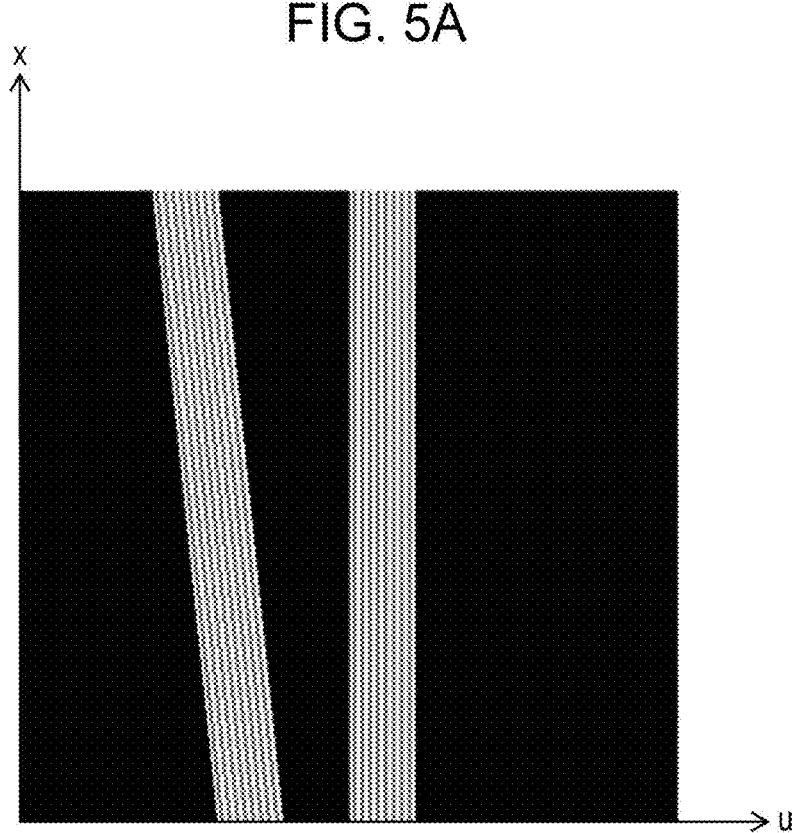
FIGS. 5A to 5C are diagrams schematically illustrating light field data and images represented by image data generated from the light field data.

FIG. 5A is a diagram illustrating light field data obtained in the case of the object arrangement illustrated in FIG. 4A.

The light field data prescribed by the light field coordinate may be converted into image data obtained in a case where an image is captured by a normal camera. The image data obtained in a case where an image is captured by a normal camera is constituted by a group of data in which scalar values (pixel values I) correspond to individual points (x, y) in a two-dimensional plane as described above. In order to convert the light field data into image data obtained in a case where an image is captured by a normal camera, integration is performed on the light field coordinate in a certain straight line direction.

For example, when integration is performed in a direction of the straight line 414, an image in which the object 403 is focused is obtained as represented by the following equation.

[Math. 1]

$$I(u) = \int_{x_1}^{x_2} L(u,x)dx \quad (1)$$

Here, "L(u, x)" represents intensity of a light beam which passes a light field coordinate (u, x) (in this embodiment, luminance in a color space), and "I(u)" represents image data.

Figure 5B:
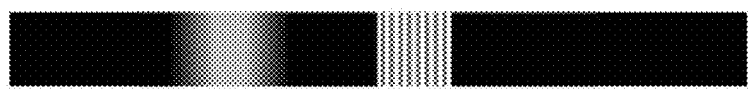

An image generated in accordance with Expression (1) is shown in FIG. 5B.

Figure 5C:
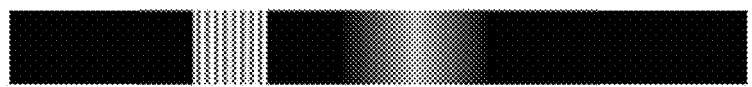

Furthermore, when integration is performed in a direction of the straight line 415, an image in which the object 404 is focused is obtained. The image is shown in FIG. 5C. Specifically, a direction of integration corresponds to a desired focus position.

Furthermore, when a range of integration is changed, a depth of field of a synthetic is changed.

In Expression (1), for example, when an integration range $[x_1, x_2]$ is large, an image having a small depth of field may be obtained. On the other hand, when the integration range is small, an image having a large depth of field may be obtained.

As an example of a case where the integration range is considerably small, when light field data L(u, 0) in which a value of x is 0 is extracted from a group of light field data, synthetic image data representing an image of deep focus (a depth of field is infinity) may be obtained.

Accordingly, with a camera which obtains light field data, when integration is performed by changing a direction on a light field coordinate, synthetic image data having a desired focus position may be obtained after image capturing. This is because light field data includes information on directions of light beams which is not included in image data.

Blur on Light Field Coordinate

Next, a blur on a light field coordinate caused by camera shake will be described.

In general, camera shake occurs when the image pickup unit 101 shifts or turns.

In this embodiment, for simplicity, only a case where the image pickup unit 101 shifts in a direction parallel to the u-plane 401 will be described. Note that, although a case where a blur is generated due to a shift of the image pickup unit 101 is described in this embodiment, the same is true for a case where a blur is generated due to a shift of an object. Furthermore, the same is true for a case where a blur caused by turning.

Here, a case where the image pickup unit 101 is fixed and an entire object shifts in a direction parallel to the u-plane 401 will be described for convenience of description. This case corresponds to a case where an entire object is fixed and the image pickup unit 101 shifts in the direction parallel to the u-plane 401.

Figure 6A:
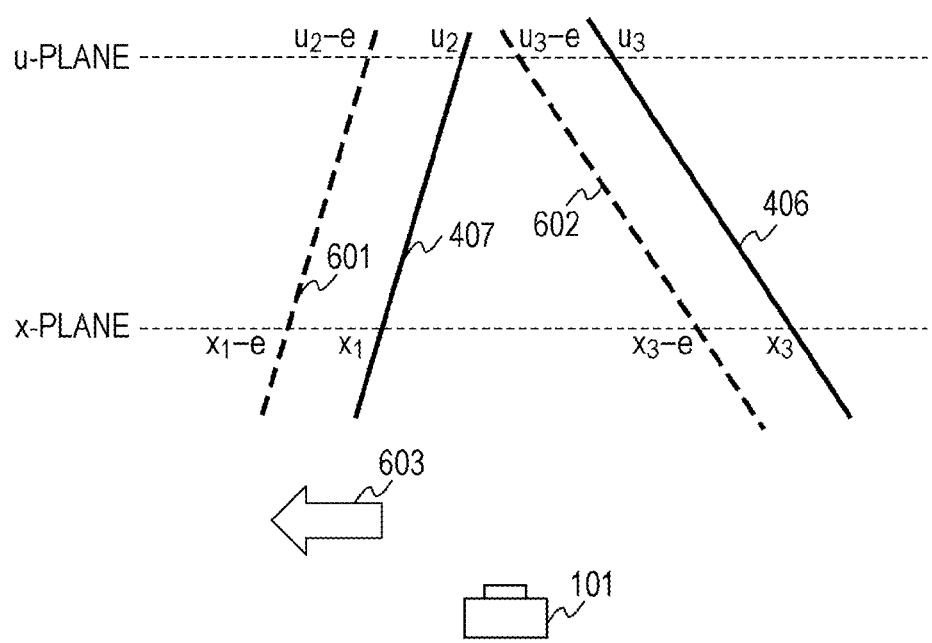
FIGS. 6A and 6B are diagrams illustrating a process of generating a blur in the light field coordinate.

In FIG. 6A, a state in which light beams are shifted is shown. Light beams 601 and 602 are obtained by shifting the light beams 407 and 406 by e in a direction parallel to the u-plane 401. An arrow mark 603 denotes the shift direction.

For example, the light beam 407 which passes a point $(u_2, x_1)$ passes a point $(u_2-e, x_1-e)$ after the shifting.

Figure 6B:
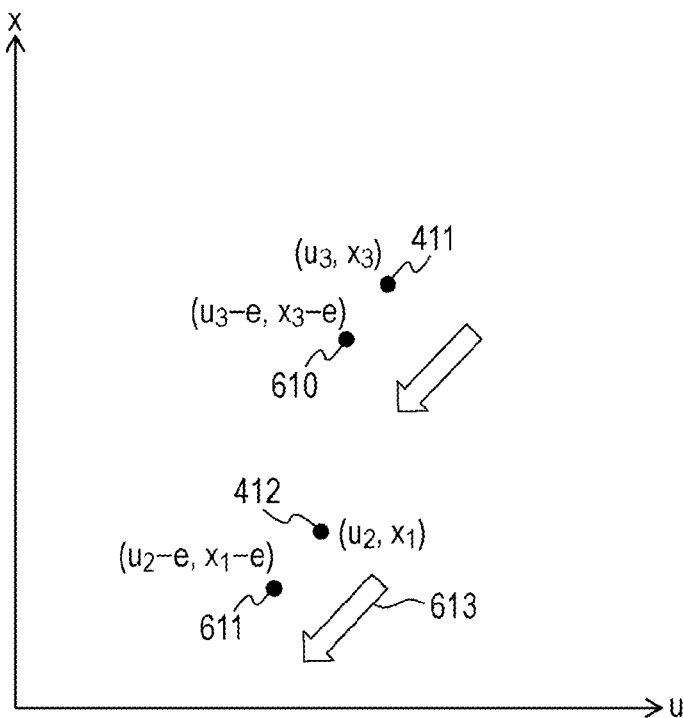

A state of the shift at this time on the light field coordinate is shown in FIG. 6B. In FIG. 6B, points 411 and 412 shift by (−e, −e) to points 610 and 611, respectively, in accordance with a shift blur. The points 610 and 611 correspond to the light beams 602 and 601, respectively.

Accordingly, on the light field coordinate, all the points are shifted by the same shift amount in accordance with the shift of the image pickup unit 101 as illustrated in FIG. 6B. The direction and amount of the shift are independent from a distance to the object. Assuming that the blur caused by the shift corresponds to a blur caused by entirely applying a filter at an angle of 45 degrees, the blur may be corrected by normal deconvolution.

Although the light field data is represented by two parameters of (u, x) hereinabove for simplicity of the description, the light field data is represented by four parameters (u, v, x, y) in practice since the u- and x-planes are two-dimensional planes. FIG. 20B is a diagram illustrating light field data and a light field coordinate. Assuming that a time point is denoted by "t", a shift vector of a principal point of the optical system (lens) of the image pickup unit 101 is denoted by "$(s_x(t), s_y(t))$", points corresponding to the light beams are shifted by $(-s_x(t), -s_y(t), -s_x(t), -s_y(t))$ on the light field coordinate.

Measured blur light field data $L_{blur}(u, v, x, y)$ is represented by the following equation.

[Math. 2]

$$L_{blur}(u, v, x, y) = \frac{1}{T}\int_0^T L(u-s_x(t), v-s_y(t), x-s_x(t), y-s_y(t))dt \quad (2)$$
$$= L(u, v, x, y) * h(u, v, x, y)$$

Here, "L" denotes strength of the light field data, "T" denotes an exposure time, and "*" denotes convolution, and a blur filter h is defined by the following equation.

[Math. 3]

$$h(u, v, x, y) \equiv \frac{1}{T}\int_0^T \delta^4(u-s_x(t), v-s_y(t), x-s_x(t), y-s_y(t))dt \quad (3)$$

Here, "$\delta^4$" denotes a four-dimensional delta function.

The process of generating a blur on a light field coordinate has been described hereinabove.

Concept Diagram of Process

Figure 7:
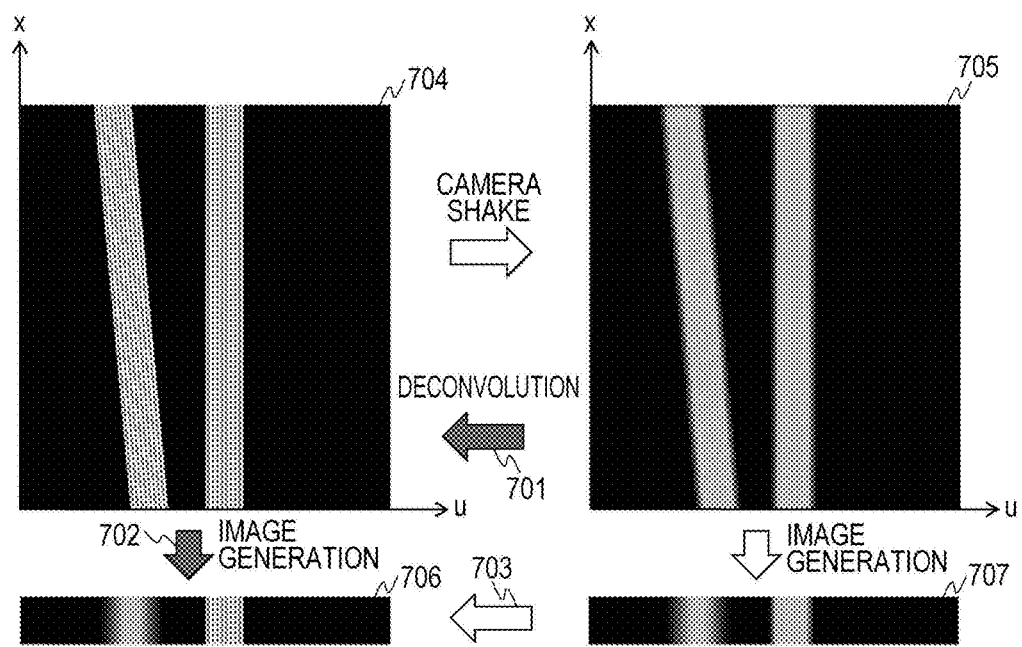
FIG. 7 is a diagram schematically illustrating a process of a first embodiment.

A concept diagram of the process of this embodiment is shown in FIG. 7.

In FIG. 7, although light field data is represented as four-dimensional data in practice, light field data is represented as two-dimensional data for convenience of illustration and an image is displayed in a one-dimensional manner.

In FIG. 7, light field data 705 is obtained when a blur is generated due to a shift blur and a blur image 707 is generated from the blur light field data 705.

In camera shake correction in the related art, the blur image 707 is directly corrected by performing blur correction (as denoted by an arrow mark 703).

However, when a shift blur occurs, a shift of a distant object is negligible in an image and a shift of an object located in the near distance is large in the image. Therefore, amounts of shifts of the objects in the image are different from each other depending on distances from the image pickup unit 101 to the objects, and accordingly, it is difficult to perform the blur correction.

Therefore, in this embodiment, the blur light field data 705 is corrected on the light field coordinate so that light field data 704 which has been subjected to the blur correction is obtained. Then image data is generated from the corrected light field data 704 so that an image 706 which has been subjected to the blur correction is obtained (as denoted by arrow marks 701 and 702).

The concept of the process of the first embodiment has been described hereinabove.

Flow of Process of First Embodiment

A flow of the process of this embodiment will be described.

Figure 8:
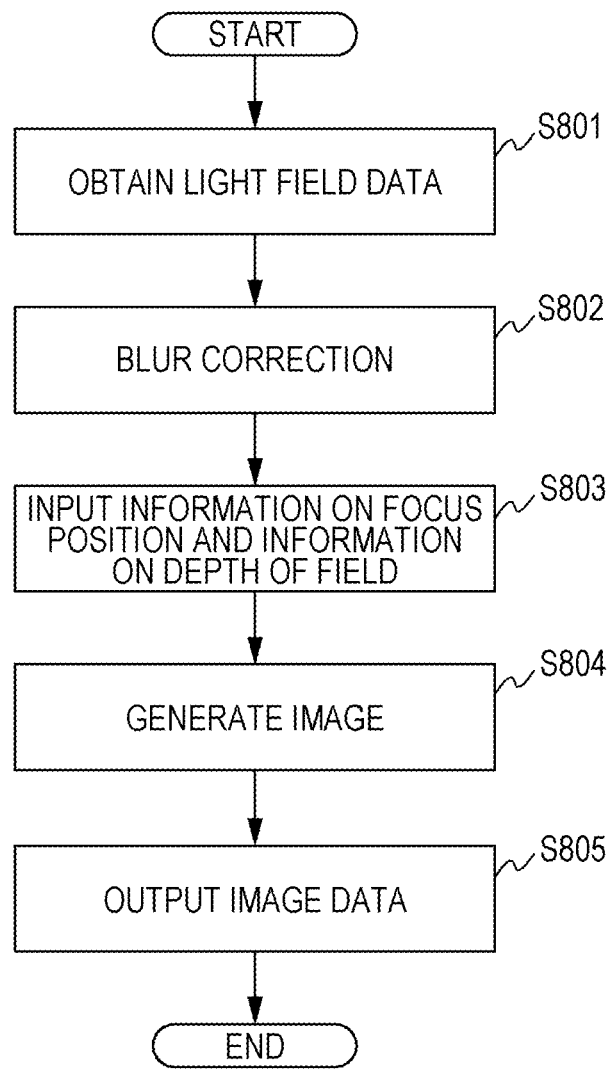
FIG. 8 is a flowchart illustrating the process of the first embodiment.

FIG. 8 is a flowchart illustrating the process of this embodiment.

In step S801, the obtaining unit 102 obtains light field data. In step S802, the blur correction unit 104 corrects the light field data on a light field coordinate. In step S803, a position of a focus plane is input from the focus position setting unit 103. In step S804, the corrected light field data is input, and the synthetic image generation unit 105 generates image data in which a blur has been corrected using the corrected light field data in accordance with information on the position of the focus plane and information on a depth of field. In step S805, the synthetic image generation unit 105 outputs the generated synthetic image data to the display unit 106, and the operation is terminated.

Flow of Process of Blur Correction Unit

Next, a flow of the process performed by the blur correction unit 104 will be described.

Figure 9:
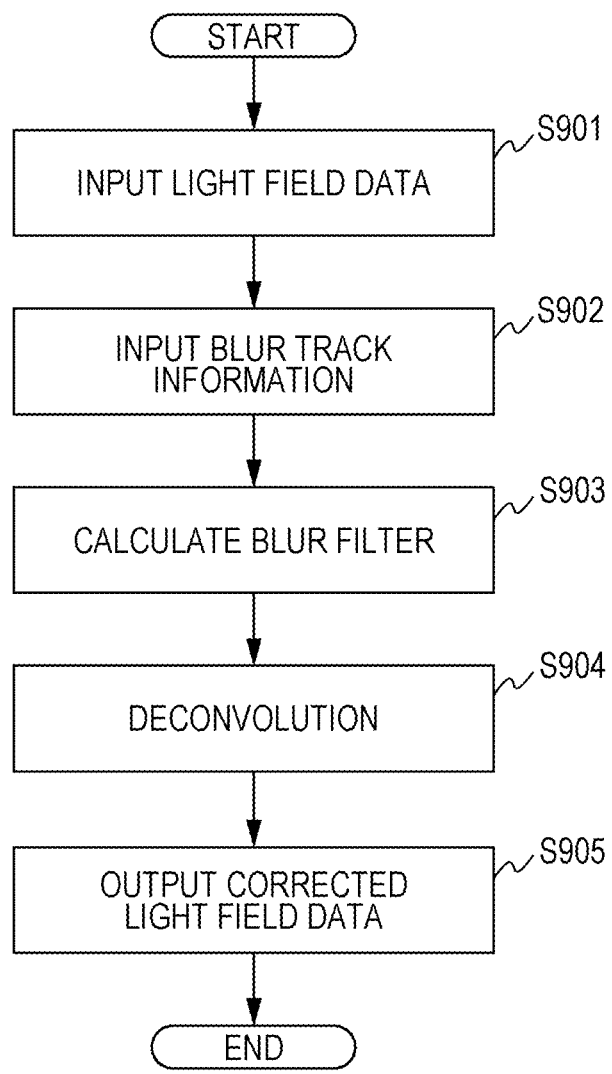
FIG. 9 is a flowchart illustrating a process performed by the blur correction unit.

FIG. 9 is a flowchart illustrating the process performed by the blur correction unit 104.

In step S901, the blur correction unit 104 receives light field data from the obtaining unit 102 through the light-field-data input terminal 301. The obtained light field data is supplied to the deconvolution unit 304.

In step S902, the image pickup unit 101 inputs blur track information through a blur track information input terminal 302. The blur track information represents a movement of the image pickup unit 101 at various time points.

In step S903, the blur filter calculation unit 303 calculates a blur filter in accordance with Expression (3) on the basis of the blur track information supplied from the image pickup unit 101.

Figure 10:
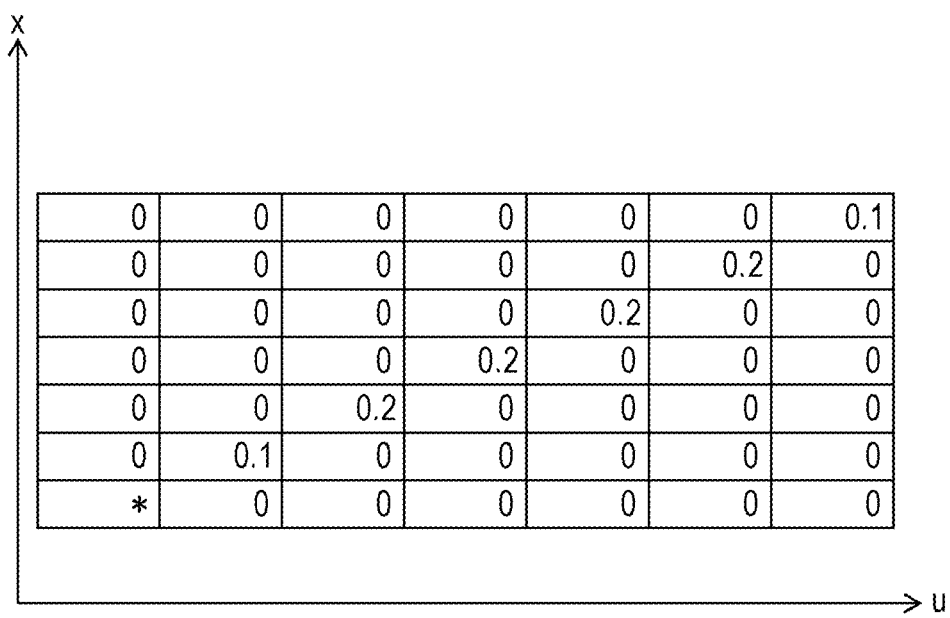
FIG. 10 is a diagram illustrating a blur filter on the light field coordinate.

A concept diagram of the blur filter is illustrated in FIG. 10. In FIG. 10, the blur filter on a u-x plane is illustrated, and "*" denotes a pixel of interest. In a case of a shift blur parallel to the u-plane 401, the blur filter is characterized by having values in a diagonal direction at an angle of 45 degrees on the u-x plane.

The description will be made with reference to the flowchart of FIG. 9 again.

In step S904, the deconvolution unit 304 corrects the light field data using the blur filter so as to generate corrected light field data. Operation of the deconvolution unit 304 will be described hereinafter in detail.

In step S905, the deconvolution unit 304 outputs the corrected light field data to the synthetic image generation unit 105 through a corrected-light-field-data output terminal 305, and the process is terminated.

Process of Deconvolution Unit

Operation of the deconvolution unit 304 will be described.

Here, deconvolution using Fourier transform will be described. When Expression (2) is subjected to a four-dimensional Fourier transform, the following equation is obtained.

[Math. 4]

$$F^4[L_{blur}](k,l,\omega,\xi)=F^4[L](k,l,\omega,\xi)H(k,l,\omega,\xi) \quad (4)$$

Here, "$F^4[\ ]$" denotes the four-dimensional Fourier transform which is defined by the following equation.

[Math. 5]

$$F^4[L](k,l,\omega,\xi)=\int_{-\infty}^{\infty}\int_{-\infty}^{\infty}\exp(-iku-ilv-i\omega x-i\xi y)L(u,v,x,y)dudvdxdy \quad (5)$$

Furthermore, inverse four-dimensional Fourier transform $F^{-4}[\ ]$ is defined by the following equation.

[Math. 6]

$$F^{-4}[L](x,y,u,v) = \left(\frac{1}{2\pi}\right)^4 \int_{-\infty}^{\infty}\int_{-\infty}^{\infty}\exp(iku+ilv+i\omega x+i\xi y)L(k,l,\omega,\xi)dkdld\omega d\xi \quad (6)$$

In Expressions (5) and (6), "i" denotes an imaginary number, and variables (k, l, ω, ζ) denote angular frequencies corresponding to (x, y, u, v), respectively. In Expression (4), "H(k, l, ω, ζ)" is defined by the following equation.

[Math. 7]

$$H(k,l,\omega,\xi)=F^4[h](k,l,\omega,\xi) \quad (7)$$

Here, "h" denotes a blur filter defined by Expression (3).

In Expression (4), "$F^4[L]$" denotes a frequency characteristic of the light field data when a blur has not been generated, and "$F^4[L_{blur}]$ (k, l, ω, ζ)" denotes a frequency characteristic of the light field data when a blur has been generated.

Multiplication using H(k, l, ω, ζ) means integration of the light field data while a movement is made in a direction parallel to a certain two-dimensional plane on a (u, v, x, y) hyperplane. Specifically, a blur may be generated by performing multiplication using H(k, l, ω, ζ).

When the light field coordinate is simply represented by (u, x) as a two-dimensional coordinate, a movement is made in a direction at an angle of 45 degrees. On the other hand, according to Expression (4), the frequency characteristic $F^4[L_{blur}]$ (k, l, ω, ζ) of the blur light field data is divided by the frequency characteristic H(k, l, ω, ζ) of the blur filter. By this, the frequency characteristic $F^4[L](k, l, \omega, \zeta)$ of the light field data when a blur has not been generated (or is reduced) may be obtained. The deconvolution unit 304 performs the inverse four-dimensional Fourier transform on the frequency characteristic $F^4[L](k, l, \omega, \zeta)$ of the corrected light field data and supplies light field data L(u, v, x, y) in which a blur has been corrected to the synthetic image generation unit 105.

The process of the deconvolution unit 304 has been described hereinabove.

Synthetic Image Generation Unit

Operation of the synthetic image generation unit 105 will be described.

The synthetic image generation unit 105 receives a position of a focus plane from the focus position setting unit 103.

Figure 11A:
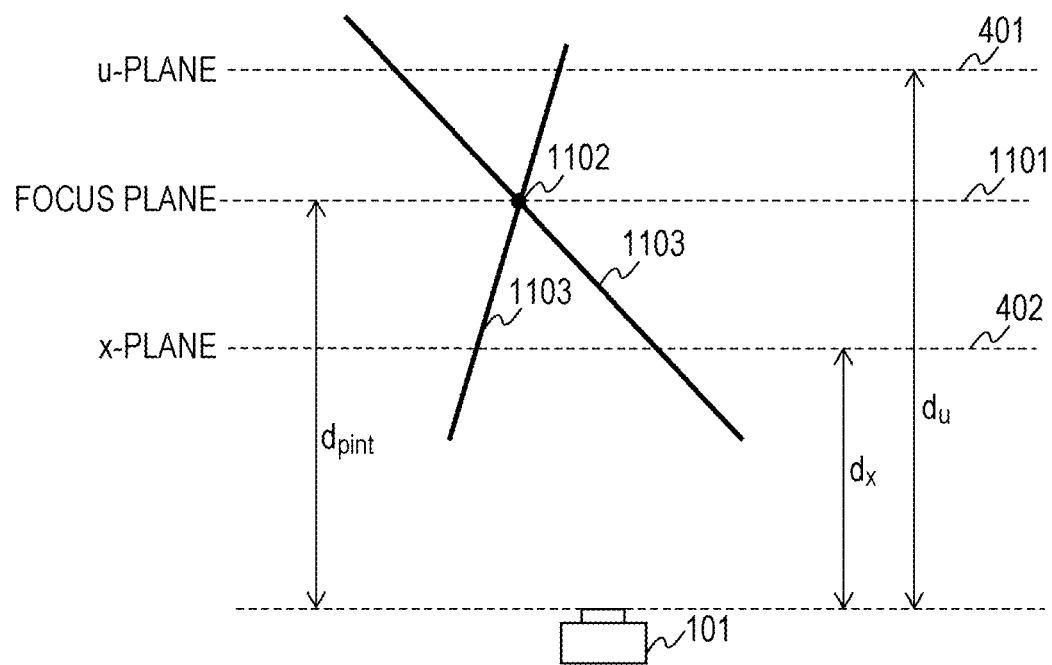
FIGS. 11A and 11B are diagrams illustrating the relationship between a focus plane and the light field data.

FIG. 11A is a diagram illustrating the positional relationship among a focus plane 1101, the u-plane 401, and the x-plane 402. All light beams 1103 output from an object 1102 are included in a straight line 1110 on the light field coordinate in FIG. 11B.

(U, V) is a coordinate component parallel to u-plane in a coordinate of the object 1102. The object 1102 serves as a point which internally divides the u-plane 401 and the x-plane 402. Therefore, the following equation is obtained.

[Math. 8]

$$(1 - \alpha)x + \alpha u = U \quad (8)$$
$$\alpha \equiv \frac{d_{pint} - d_x}{d_u - d_x}$$

This is an equation of the straight line 1110.

As with the case of U, the following equation about V is obtained.

[Math. 9]

$$(1-\alpha)y+\alpha v=V \quad (9)$$

Assuming that "α" denotes the position of the focus plane, in order to obtain an image in which the object 1102 is focused, the light field data is integrated in a direction of the straight line 1110. Therefore, the synthetic image generation unit 105 calculates the following equation.

[Math. 10]

$$I(U, V) = \int L\left(\left(1 - \frac{1}{\alpha}\right)x + \frac{U}{\alpha}, \left(1 - \frac{1}{\alpha}\right)y + \frac{V}{\alpha}, x, y\right)dx dy \quad (10)$$

In this way, image data is obtained.

The operation of the synthetic image generation unit 105 has been described hereinabove.

Figure 12A:
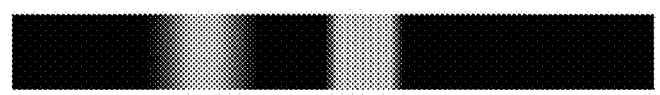
FIGS. 12A to 12C are diagrams illustrating effects of the first embodiment.
Figure 12B:
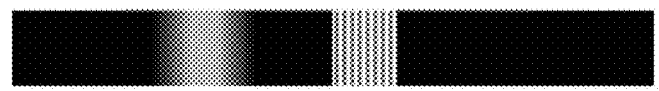
Figure 12C:

FIGS. 12A to 12C are diagram illustrating effects obtained when the image processing according to this embodiment is performed. FIG. 12A is a diagram illustrating a blur image generated by a shift blur when image capturing is performed in the object arrangement illustrated in FIG. 4. FIGS. 12B and 12C are diagrams illustrating images in which the objects 403 and 404 are focused, respectively, after the blur correction is performed according to this embodiment. In FIG. 12B, a blur of the object 404 is generated due to out-of-focus, and a blur in a focus position has been corrected.

As described above, according to this embodiment, correction is performed in the light field space so that a shift blur may be corrected at high accuracy by image processing. In this way, image data which attains high image quality may be obtained. According to this embodiment, novel information processing using light field data which is not realized by the computational photography in the related art may be realized.

Modifications

The information processing unit 100 may be incorporated in the image pickup unit 101. With this configuration, it is not necessary for the user to physically operate two devices, i.e., the information processing unit 100 and the image pickup unit 101, that is, the foregoing embodiment may be embodied by operating a single device.

The image pickup unit 101 may include a transmission unit which externally transmits light field data through a network (a LAN, a WAN, or the like). The light field data transmitted from the image pickup unit 101 is received by the remotely-provided information processing unit 100 through the network, and the processes in the foregoing embodiment are performed in the information processing unit 100. By this, distribution of calculation loads may be realized and cost of calculation processing of the image pickup unit 101 may be reduced, for example.

Figure 21:
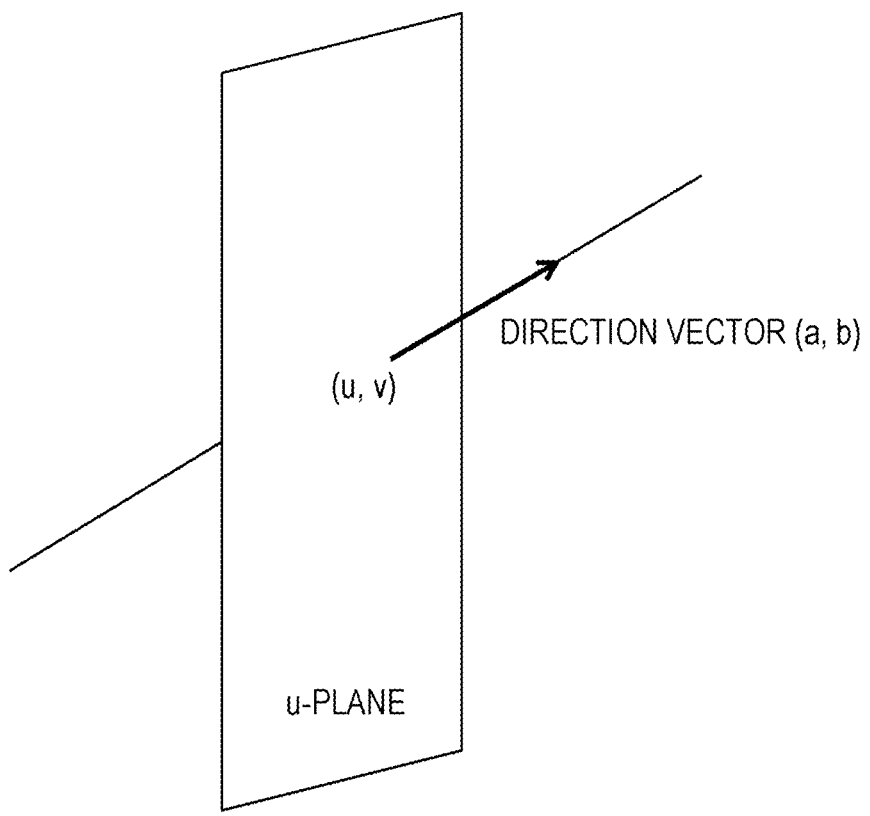
FIG. 21 is a diagram illustrating another light field coordinate.

In this embodiment, although a case of the light filed coordinate (u, v, x, y) is taken as an example, any coordinate system may be employed as long as a light beam in a three-dimensional space is specified. For example, as illustrated in FIG. 21, a u-plane may be virtually provided and a light field coordinate (u, v, a, b) may be employed in addition to a vector (a, b) of a direction in which a light beam is output from the u-plane.

In this embodiment, the case where intensity of a light beam corresponds to luminance in a color space has been described as an example. However, light emission luminance of various wavelengths or RGB values in a color space may be employed as the intensity. For example, in a case of RGB values, planes of various colors are individually subjected to demosaicing before the process of this embodiment is performed. By this, a blur may be corrected.

The deconvolution method is not limited to that described above. For example, an algorithm of Lucy-Richardson deconvolution, an algorithm using a Wiener filter, an algorithm using a normalization filter, or the like may be used.

The units of this embodiment (the deconvolution unit 304, for example) may be means for attaining the functions of the units (deconvolution means, for example). This is true for embodiments described below.

Second Embodiment

In the first embodiment, the deconvolution unit 304 performs the inverse four-dimensional Fourier transform and supplies light field data in which a blur has been corrected to the synthetic image generation unit 105.

However, in a second embodiment, a case where a deconvolution unit 304 does not perform the inverse four-dimensional Fourier transform but supplies a frequency characteristic of light field data in which a blur has been corrected to a synthetic image generation unit 105 will be described.

Only differences from the first embodiment will be described.

The deconvolution method of the first embodiment is also applied to the second embodiment, and the synthetic image generation unit 105 receives frequency characteristic data of light field data.

Figure 13:
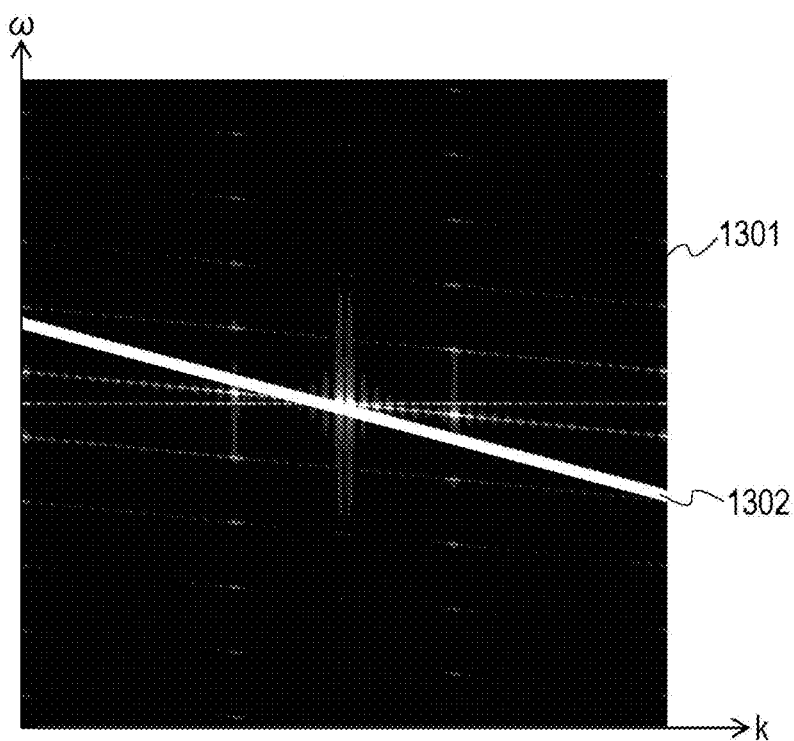
FIG. 13 is a diagram illustrating a frequency characteristic of the light field data.

FIG. 13 is a diagram schematically illustrating light field data which has been subjected to Fourier transform. A reference numeral 1301 denotes a frequency characteristic of light field data.

The synthetic image generation unit 105 calculates the following amount.

[Math. 11]

$$F^2[I](k,l) = \alpha^2 F^4[L](\alpha k, \alpha l, (1-\alpha)k, (1-\alpha)l) \quad (11)$$

Here, definition of α is the same as that of Expression (8) and "α" denotes a position of a focus plane. Furthermore, "$F^2[\ ]$" denotes two-dimensional Fourier transform and is defined by the following equation.

[Math. 12]

$$F^2[I](k,l) = \int dudv \exp(-iku - ilv) I(u,v) \quad (12)$$

Expression (11) represents extraction of one-dimensional information in a direction of a straight line which passes the center of an image in a space in which the light field data is subjected to the Fourier transform. A reference numeral 1302 denotes an example of a direction in which one-dimensional information is extracted and the extraction direction varies in accordance with a position of the focus plane.

Although the light field data is illustrated in a two-dimensional manner in FIG. 13 for simplicity, the light field data is four-dimensional light field data in practice. Therefore, in practice, Expression (11) represents extraction of two-dimensional information along a certain plane from a four-dimensional frequency space of the light field data.

Next, the synthetic image generation unit 105 performs inverse two-dimensional Fourier transform on two-dimensional information $F^2[I](k, l)$ extracted along the certain plane from four-dimensional frequency characteristic data so as to obtain image data in which a focus plane 1101 is focused.

Flow of Process in Second Embodiment

Figure 14:
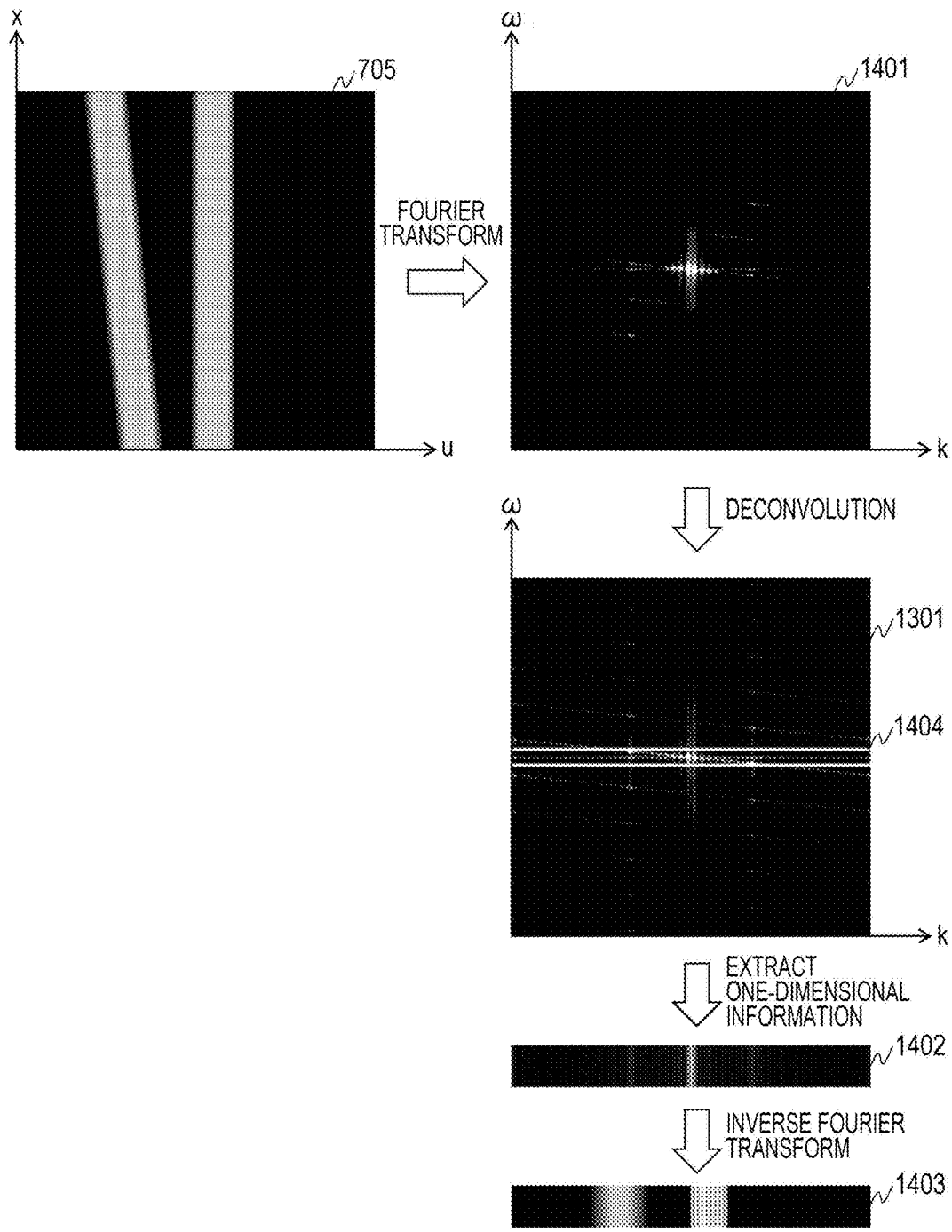
FIG. 14 is a diagram schematically illustrating a process of a second embodiment.

A concept diagram of the process of this embodiment is illustrated in FIG. 14. Although light field data is actually represented as four-dimensional data, the light field data is represented as two-dimensional data for convenience of illustration and an image is displayed in a one-dimensional manner.

The deconvolution unit 304 performs four-dimensional Fourier transform on blur light field data 705 so as to obtain a frequency characteristic 1401 of the blur light field data 705. Subsequently, the deconvolution unit 304 performs deconvolution using a frequency characteristic of a blur filter so as to obtain a frequency characteristic 1301 of the light field data in which the blur has been corrected.

Next, the synthetic image generation unit 105 extracts one-dimensional information in a direction of a certain straight line from the frequency characteristic 1301 of the light field data in which the blur has been corrected so as to obtain a frequency characteristic 1402 of an image which has been corrected. Here, a portion denoted by a white frame 1404 is extracted.

Finally, the frequency characteristic 1402 of the corrected image is subjected to inverse two-dimensional Fourier transform so that corrected image data 1403 is obtained.

Principle of Second Embodiment

A fact that the calculation of the inverse two-dimensional Fourier transform of Expression (11) is logically equivalent to the calculation (Expression (10)) of the first embodiment will be described.

When Expression (11) is described in detail using Expression (5) of the definition of the four-dimensional Fourier transform, the following equation is obtained.

[Math. 13]

$$\alpha^2 F^4[L](\alpha k, \alpha l, (1-\alpha)k, (1-\alpha)l) = \alpha^2 \int dxdy \int dudv \exp(-ik[\alpha u + (1-\alpha)x] - il[\alpha v + (1-\alpha)y]) L(u,v,x,y) \quad (13)$$

Here, variables are converted as follows.

[Math. 14]

$$\begin{pmatrix} U \\ V \\ x \\ y \end{pmatrix} = \begin{pmatrix} \alpha & 0 & 1-\alpha & 0 \\ 0 & \alpha & 0 & 1-\alpha \\ 0 & 0 & 1 & 0 \\ 0 & 0 & 0 & 1 \end{pmatrix} \begin{pmatrix} u \\ v \\ x \\ y \end{pmatrix} \quad (14)$$

Consequently, an equation "$dUdVdxdy = \alpha^2 dudvdxdy$" is obtained, and the equation is assigned to Expression (13) as follows.

[Math. 15]

$$\alpha^2 F^4[L](\alpha k, \alpha l, (1-\alpha)k, (1-\alpha)l) = \quad (15)$$

$$\alpha^2 \int dxdy \int dudv \exp(-ik[\alpha u + (1-\alpha)x] - il[\alpha v + (1-\alpha)y])$$

$$L(u,v,x,y) = \int dUdV \exp(-ikU - ikV)$$

$$\int dxdy L\left(\frac{U}{\alpha} + \left(1 - \frac{1}{\alpha}\right)x, \frac{V}{\alpha} + \left(1 - \frac{1}{\alpha}\right)y, x, y\right)$$

In Expression (15), the following portion is the same as Expression (10).

[Math. 16]

$$\int dxdy L\left(\left(1 - \frac{1}{\alpha}\right)x + \frac{U}{\alpha}, \left(1 - \frac{1}{\alpha}\right)y + \frac{V}{\alpha}, x, y\right) \quad (16)$$

Assuming that Expression (16) is replaced by I(U, V), Expression (15) is represented as follows.

[Math. 17]

$$\alpha^2 F^4[L](\alpha k, \alpha l, (1-\alpha)k, (1-\alpha)l) = \int dUdV \exp(-ikU - ilV) I(U,V) = F^2[I](k,l) \quad (17)$$

According to Expressions (16) and (17), it is apparent that Expression (11) is equal to the two-dimensional Fourier transform of Expression (10), and accordingly, a result of Expression (10) is obtained by performing inverse two-dimensional Fourier transform on Expression (11).

The principle of the second embodiment has been described hereinabove.

As described above, in this embodiment, two-dimensional information is extracted along a certain plane in a four-dimensional frequency space and inverse two-dimensional Fourier transform is performed so that image data is generated, and accordingly, a shift blur may be corrected by a calculation amount smaller than that of the first embodiment.

According to this embodiment, novel information processing using light field data which is not realized by the computational photography in the related art may be realized.

Third Embodiment

In the first and second embodiments, the blur correction is performed by correcting the light field data on the light field coordinate. In a third embodiment, a case where aberration of a main lens is corrected by correcting light field data on a light field coordinate will be described.

Figure 15:
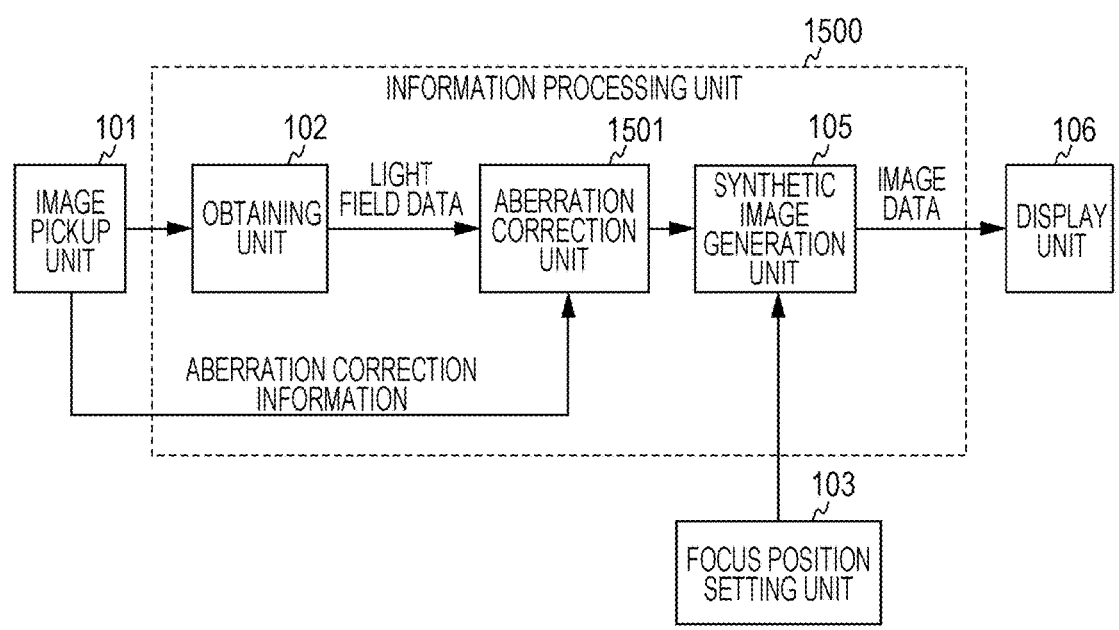
FIG. 15 is a diagram illustrating main components of an image pickup device according to a third embodiment.

FIG. 15 is a diagram illustrating main components of an image pickup device according to the third embodiment.

Only differences from the first embodiment will be described. In an information processing unit 1500, an aberration correction unit 1501 receives light field data obtained by an obtaining unit 102 and lens aberration correction information and performs aberration correction on a light field coordinate.

Principle of Aberration Correction

Figure 16:
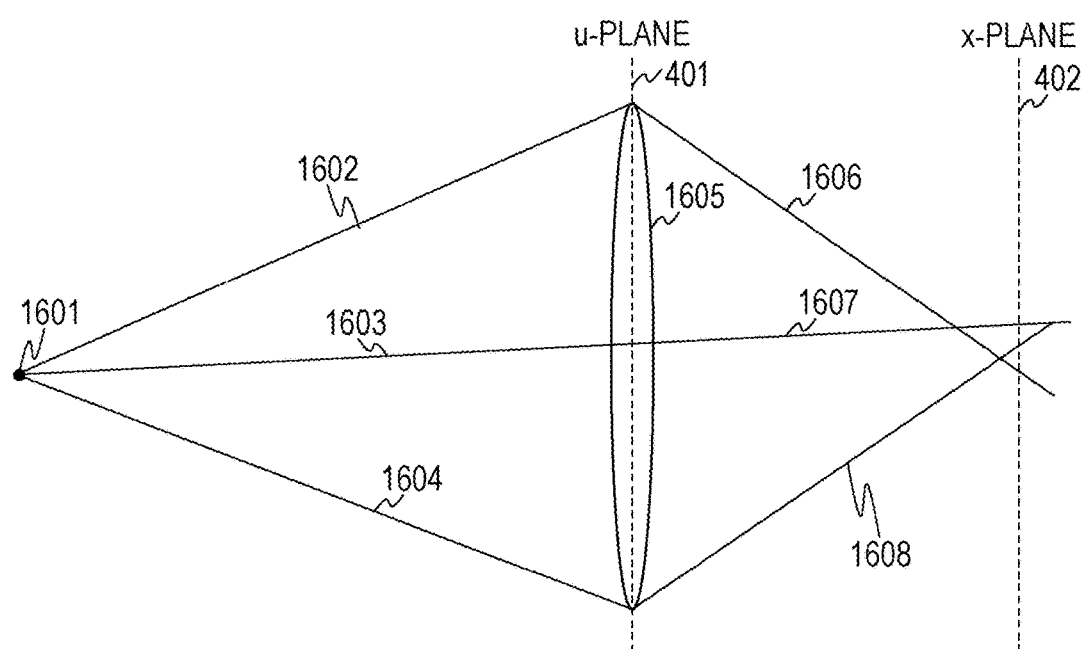
FIG. 16 is a diagram illustrating paths of light beams when aberration is generated.

Operation principle of this embodiment will be described. FIG. 16 is a diagram illustrating a state in which light beams 1602 to 1604 output from a point 1601 are refracted by a lens 1605, and consequently, light beams 1606 to 1608 are obtained. If the lens 1605 is an ideal lens, the light beams 1606 to 1608 converge on one point. However, in general, the light beams 1606 to 1608 do not converge on one point due to aberration. Note that, although an optical system, such as a microlens array, which distinguishes directions of light beams should be inserted after the lens 1605 in order to obtain light field data, such an optical system is omitted in this embodiment.

In this embodiment, a u-plane 401 is disposed so as to coincide with a plane of the lens 1605 and an x-plane 402 is virtually disposed on an image plane side. The image pickup unit 101 obtains information on directions and intensity of the light beams 1606 to 1608 which pass the u-plane 401 and the x-plane 402.

Figure 17:
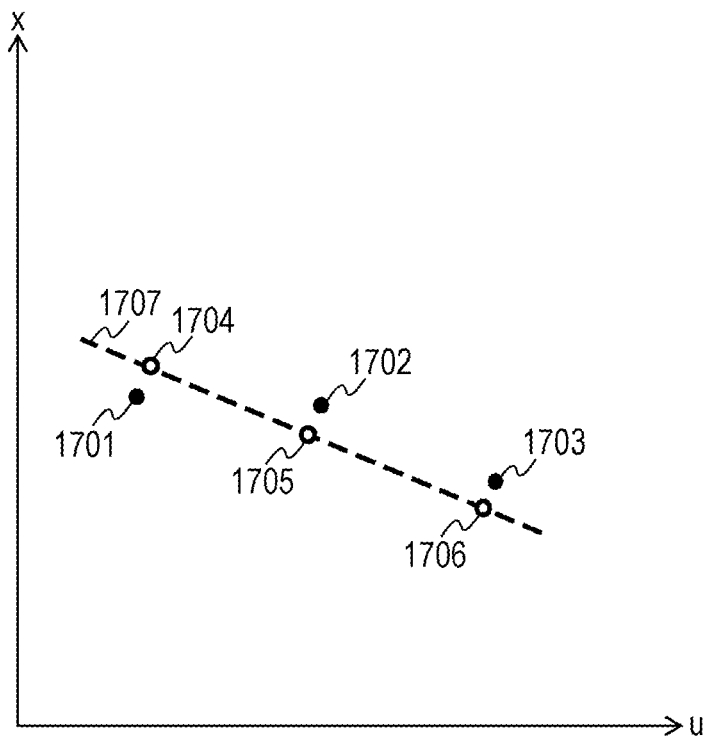
FIGS. 17A and 17B are diagrams illustrating the correspondence relationship between light beams in a case where aberration is generated and light beams in a case where aberration is not generated on a light field coordinate.

In FIG. 17A, the light beams 1606 to 1608 are plotted on a light field coordinate, and points 1701 to 1703 correspond to the light beams 1606 to 1608, respectively.

Although a group of light beams which converge on one point is included in a certain straight line on the light field coordinate as described in the first embodiment, the points 1701 to 1703 are not included in a straight line since the light beams 1606 to 1608 do not converge on one point due to the aberration.

On the other hand, when the lens 1605 is an ideal lens, light beams obtained after the light beams 1602 to 1604 pass the lens 1605 are plotted as points 1704 to 1706 on the light field coordinate. In this case, since the light beams which pass the lens 1605 converge on one point, the points 1704 to 1706 are included in a straight line 1707.

It is assumed that the obtaining unit 102 holds the correspondence relationship between a case of the ideal lens and a case of the actual lens on the light field coordinate in a lookup table (hereinafter referred to as an "LUT").

It is assumed that coordinates of the points 1701 to 1703 are represented by $(u_1, x_1)$, $(u_2, x_2)$, and $(u_3, x_3)$, respectively, and coordinates of the points 1704 to 1706 are represented by $(U_1, X_1)$, $(U_2, X_2)$, and $(U_3, X_3)$, respectively. In this case, the LUT stores the correspondence relationships $(u_1, x_1, U_1, X_1)$, $(u_2, x_2, U_2, X_2)$, and $(u_3, x_3, U_3, X_3)$. The correspondence relationship between the ideal lens and the actual lens caused by the aberration is included in information representing a factor of influence given to an image represented by image data.

In FIG. 17B, a reference numeral 1710 denotes an example of the LUT. In the LUT, the light field coordinate (u, x) of the actual lens is stored on a left side and the light field coordinate (U, X) of the ideal lens is stored on a right side.

Although the foregoing description has been made using a two-dimensional coordinate (u, x) for simplicity, the LUT 1710 stores the corresponding relationship of a four-dimensional coordinate (u, v, x, y) in practice.

As a method for generating the LUT, a light field coordinate of a light beam which is refracted by the actual lens is associated with a light field coordinate of a refracted light beam obtained in accordance with an equation of the ideal lens. Any other method may be employed as long as the correspondence relationship is obtained.

The aberration correction unit 1501 refers to the LUT 1710 and performs coordinate transfer on the light field coordinate so as to obtain a light field coordinate of the ideal lens.

Although the case where the LUT is used has been described in this embodiment, when refraction of a light beam by the lens 1605 may be represented by a formula, the light field coordinate may be converted in accordance with the formula.

As described above, in this embodiment, the aberration of the main lens may be corrected at higher accuracy by obtaining the light field data and transferring (correcting) the light field data on the light field coordinate.

Note that, although the case where the spherical aberration is corrected has been described in this embodiment, other aberration such as chromatic aberration may be similarly corrected. According to this embodiment, novel information processing using light field data which is not realized by the computational photography in the related art may be realized.

Fourth Embodiment

In the first and second embodiments, the light field coordinate is transferred so that the blur correction is performed. However, in a fourth embodiment, blur correction is performed by selectively combining light beams.

Figure 18:
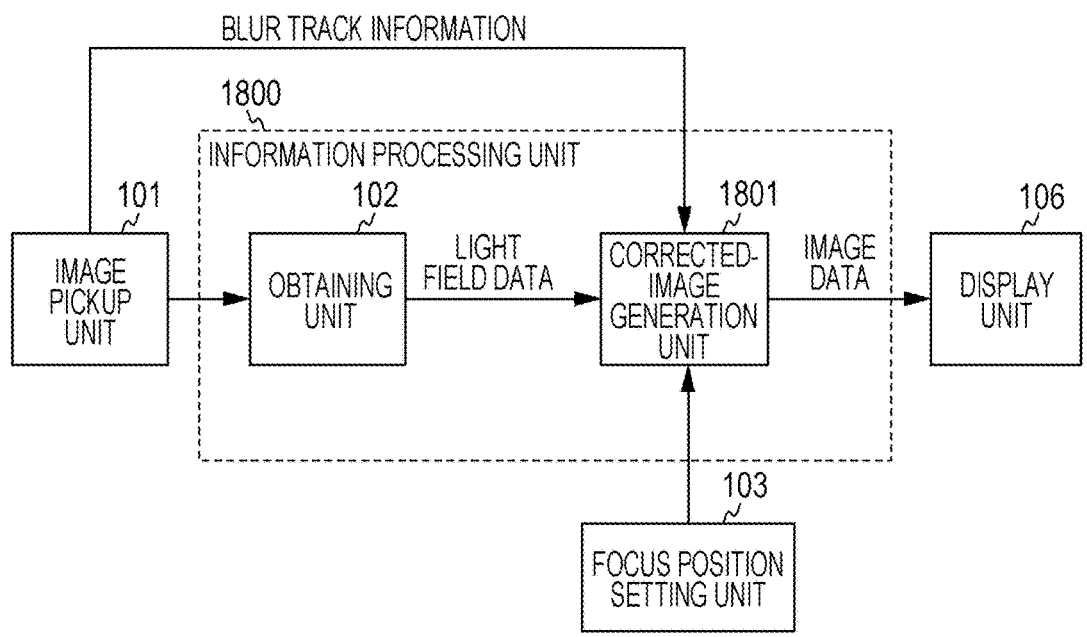
FIG. 18 is a diagram illustrating main components of an image pickup device according to a fourth embodiment.

FIG. 18 is a diagram illustrating main components of an image pickup device according to this embodiment. Only differences from the first embodiment will be described.

In an information processing unit 1800, a corrected-image generation unit 1801 obtains an image in which a blur has been corrected by performing addition and synthesis on required data in light field data obtained by an obtaining unit 102 on the basis of blur track information and position information of a focus plane.

Principle of Blur Correction

The principle of blur correction of this embodiment is similar to that of the first embodiment, and only a way of expression in calculation is different.

It is assumed that an inverse filter of the blur filter represented by Expression (3) is denoted by "$h_{inv}(u, v, x, y)$". The inverse filter may be obtained by the following equation, for example.

[Math. 18]

$$h_{inv}(u, v, x, y) = F^{-4}\left[\frac{1}{F^4[h]}\right] \quad (18)$$

Here, "$F^{-4}[\ ]$" denotes inverse four-dimensional Fourier transform.

The inverse filter $h_{inv}$ satisfies the following equation: $h_{inv}*h=\delta^4(u, v, x, y)$. Here, "*" denotes convolution and "$\delta^4$" denotes a four-dimensional delta function.

When the inverse filter $h_{inv}$ is used, a process of deconvolution is represented as follows.

[Math. 19]

$$L(u,v,x,y) = h_{inv} * L_{blur}(u,v,x,y) \qquad (19)$$

Since an image in which a blur has been finally corrected may be obtained by Expression (10), Expression (19) is assigned to Expression (10) as follows.

[Math. 20]

$$I(U, V) = \int h_{inv} * L_{blur}\left(\left(1-\frac{1}{\alpha}\right)x + \frac{U}{\alpha}, \left(1-\frac{1}{\alpha}\right)y + \frac{V}{\alpha}, x, y\right) dx dy \qquad (20)$$

The corrected-image generation unit 1801 selects obtained light beam information $L_{blur}$ in accordance with Expression (20) and performs weighting and addition so as to obtain an image in which the blur has been corrected.

As described above, according to this embodiment, image data in which a blur has been directly corrected may be obtained by selectively combining light beams from the light field data. According to this embodiment, novel information processing using light field data which is not realized by the computational photography in the related art may be realized.

Fifth Embodiment

In the first to fourth embodiments, the process performed on images which are normally viewed by human beings has been described. In a fifth embodiment, a case where distance image data is generated from light field data as image data representing a distance to an object will be described.

Figure 11B:
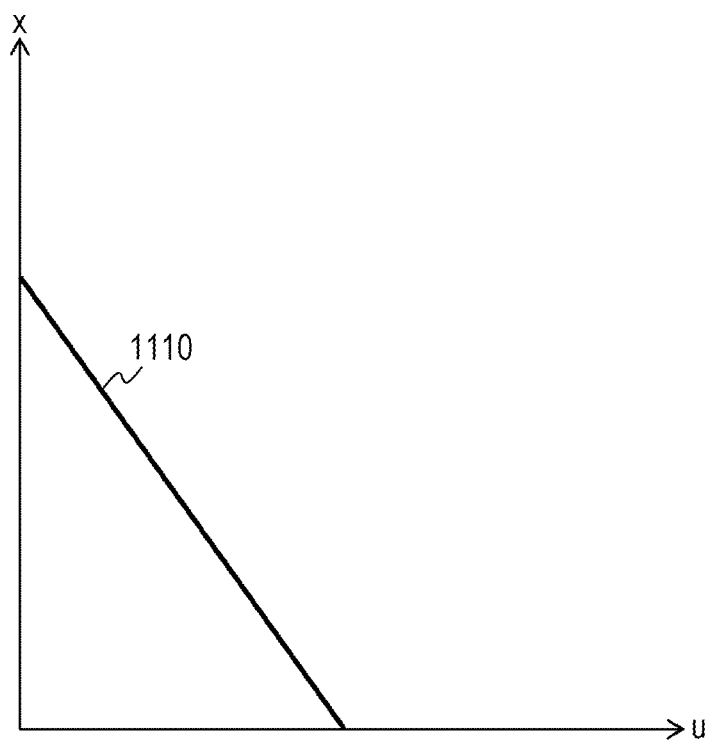

As illustrated in FIGS. 11A and 11B, light beams output from one point are included in a straight line on a light field coordinate.

Assuming that a "distance" to an object is defined as a distance measured from the image pickup unit 101 to the object in a direction parallel to an optical axis of an image pickup unit 101, an inclination of a straight line on a light field coordinate depends on the distance to an object as illustrated in Expression (8) of the first embodiment.

Specifically, a straight line is detected and an inclination is obtained on the light field coordinate so that a distance to an object is obtained.

As a method for obtaining an inclination of a light beam of light field data on the light field coordinate, a method using an edge extraction filter or a method using Hough transform may be employed. Such a method is equivalent to obtainment of an inclination of a light beam by performing a correction process on light field data. Any of the methods may be used or one of other methods may be used.

Figure 19:
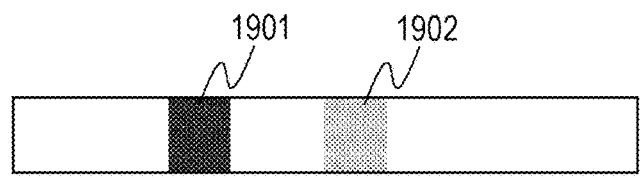
FIG. 19 is a diagram illustrating a distance image.

In FIG. 19, a process of detecting an inclination of a straight line is performed on light field data 704 so that the light field data 704 is converted into distance image data in the object arrangement of FIG. 4. In FIG. 19, it is assumed that a possible range of a pixel value is represented by "[0, 255]", and the smaller a distance to an object is, the smaller a pixel value of a distance image is. Furthermore, it is assumed that a background portion of objects 403 and 404 are sufficiently located far and rounded as the maximum value 255 of the pixel value. A reference numeral 1901 corresponds to the object 403 and a reference numeral 1902 corresponds to the object 404. Since the object 403 is nearer to the image pickup unit 101 relative to the object 404, a pixel value of the portion 1901 is smaller than a pixel value of the portion 1902.

As described above, in this embodiment, distance image data which is not image data of a normal image may be obtained by performing a correction process such as edge extraction filter or the Hough transform on a light field coordinate. According to this embodiment, novel information processing using light field data which is not realized by the computational photography in the related art may be realized.

Sixth Embodiment

In a sixth embodiment, a case where color correction is performed on a light field coordinate on the basis of pixel arrangement of RGB filters will be described.

As illustrated in FIG. 2B, when a Plenoptic camera or a multiple camera is used, light field data is obtained while directions of light beams are distinguished. In this embodiment, a case where an image pickup element 210 obtains colors using a color filter array (CFA) such as a Bayer array is taken as an example.

Although the image pickup element 210 captures discrete multi-view images of slightly different viewpoints, in a case of an image pickup element which obtains colors using a color filter array, color lack occurs in each of color planes of R, G, and B. Therefore, when a refocusing process is to be performed using multi-view images captured by the image pickup element 210, a process of correcting colors which lack before the process, that is, color correction (demosaicing process), is to be performed.

However, if the color correction is performed simply using surrounding pixels, the individual multi-view images have blurs and sharpness is deteriorated. In addition, when the refocusing process is performed on an image of deteriorated sharpness, a finally-obtained image also has deteriorated sharpness. In particular, deterioration of sharpness of a G plane causes deterioration of sharpness in terms of brightness of an image, and accordingly, sharpness in visual effects is deteriorated.

To address this problem, a method for reducing a blur caused by correction by performing direction determination during the color correction process has been proposed.

Furthermore, as a method for reducing a degree of a blur more than the method using the direction determination, a method for enhancing correction accuracy using images of other viewpoints in the color correction process has also been proposed. Compositions of the multi-view images are substantially the same as one another except that angles of field are slightly different. Therefore, it is highly possible that a pixel corresponding to a pixel to be corrected or a pixel similar to the pixel to be corrected is included in image data of the other viewpoints. In this method, a process of block matching, for example, is used to perform searching in accordance with similarity of images, and a similar pixel is used for the correction. However, when a plurality of objects having similar shapes are included, a number of matching errors occur, and accordingly, the correction is not performed at high accuracy.

In this embodiment, a similar pixel is searched for on a light field coordinate. As illustrated in FIG. 4, in a light field coordinate, all light beams output from a certain point of an object are included in a single straight line. In this embodiment, making use of this fact, a straight line which includes all light beams output from an object corresponding to a pixel to be corrected is obtained, pixels which are included in this straight line or which are located near the straight line are retrieved from the multi-view images, and weighting and addition are performed so that the correction is performed. When the pixels are included in the straight line or located near the straight line, the pixels correspond to light beams output from the same object or near the object. Accordingly, matching errors may be reduced and correction may be performed at high accuracy.

Figure 22A:
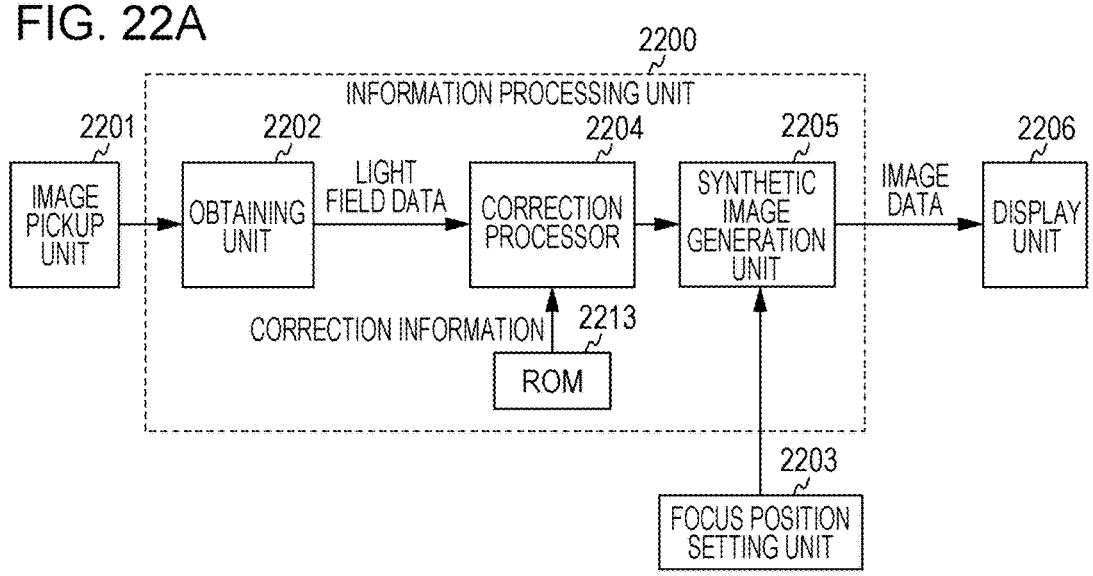
FIGS. 22A and 22B are diagrams illustrating main configurations of image pickup devices according to sixth, eighth, and ninth embodiments.
Figure 22B:
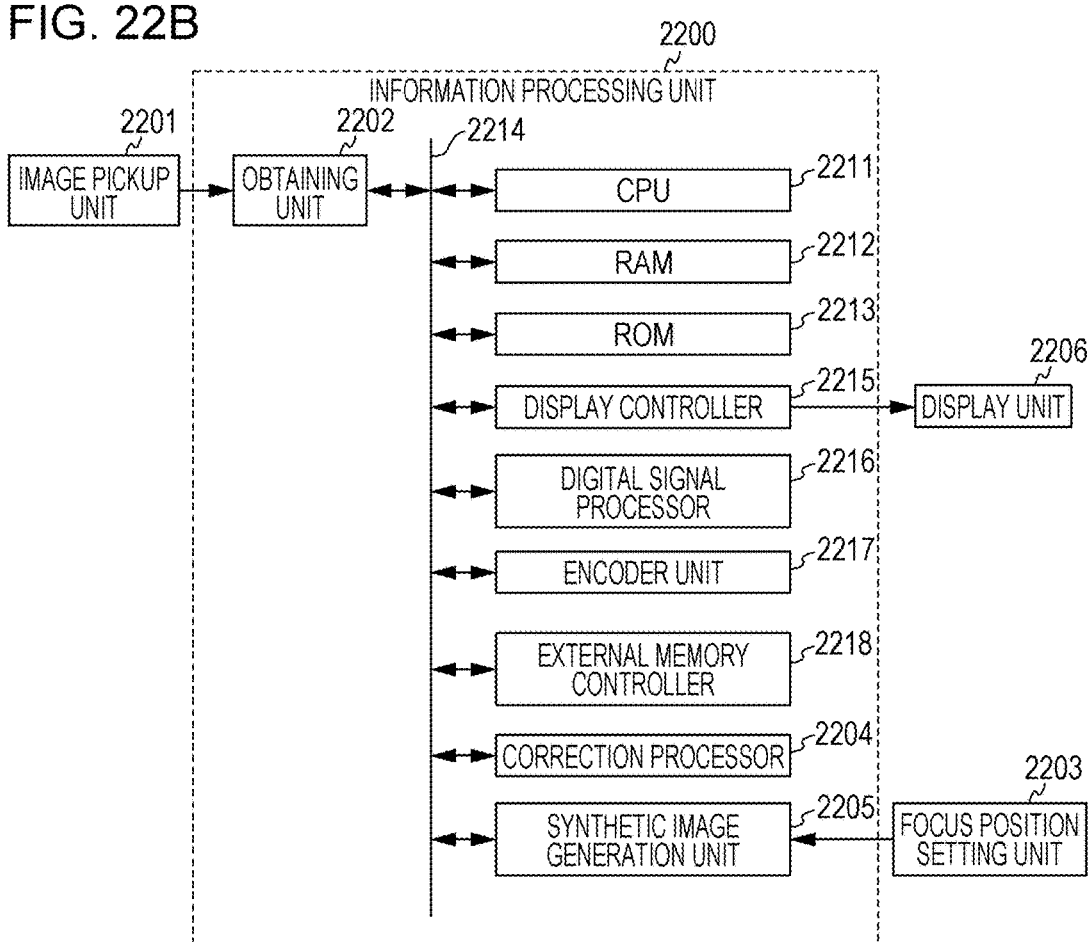

FIGS. 22A and 22B are diagrams illustrating main components of an image pickup device according to this embodiment.

Only differences from the first embodiment will be described. A correction processor 2204 receives, as correction information, information on color filters of the image pickup element 210 from a ROM 2213 and information on a distance to an object from an obtaining unit 2202, and performs color correction on the light field coordinate.

Operation principle of this embodiment will be described.

Figure 23A:
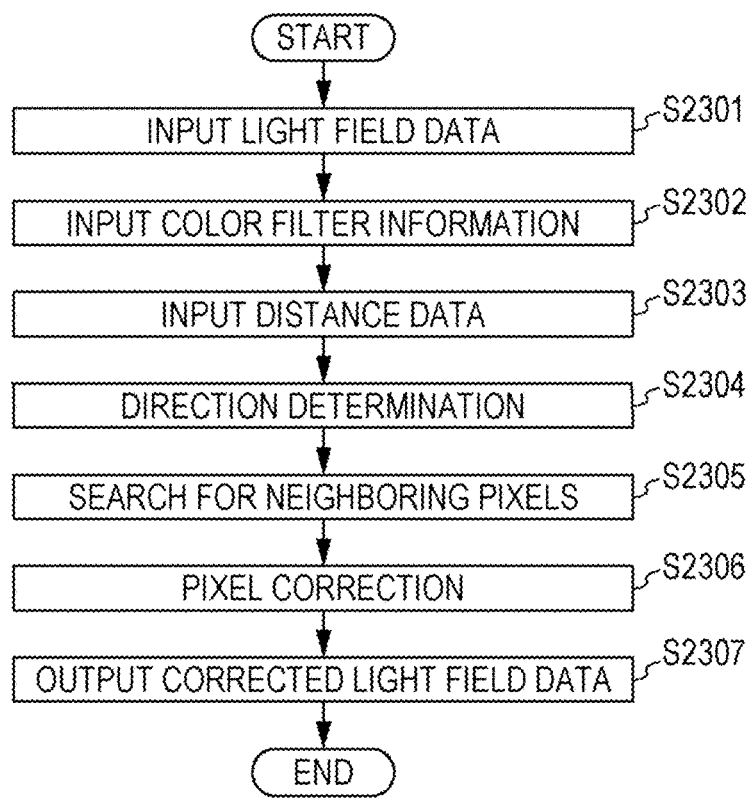
FIGS. 23A to 23C are a flowchart and schematic diagrams illustrating a process according to the sixth embodiment.

FIG. 23A is a flowchart illustrating a process of this embodiment. The correction processor 2204 obtains light field data to be used in the process from the obtaining unit 2202 (in step S2301). Next, color filter information and distance data are input as correction information from the ROM 2213 (in step S2302 and step S2303). Examples of a method for inputting distance data performed in step S2303 include a method for obtaining distance data using a distance measurement sensor disposed in an image pickup unit 2201, a method for obtaining distance data using an image pickup device for distance measurement, and a method for generating distance data using light field data which has been described in the fifth embodiment.

In FIG. 25, examples of captured image data and distance image data which are to be used in this process are shown. The captured image data corresponds to the distance image data on a pixel-by-pixel basis. Furthermore, only captured image data of a G plane is shown in FIG. 25 and pixels in R and B planes are omitted. In this embodiment, lacking pixels in the G plane are subjected to the color correction. As a value of the distance image data becomes large (bright), an object corresponding to the data is located in a far distance.

Figure 23B:
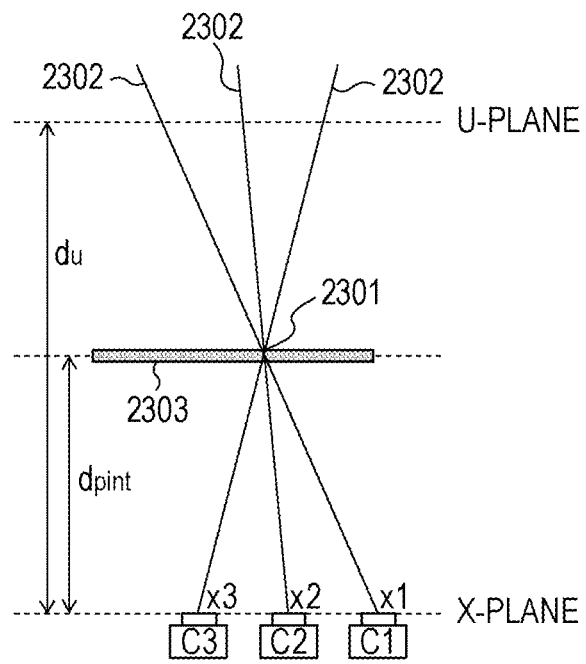
Figure 23C:
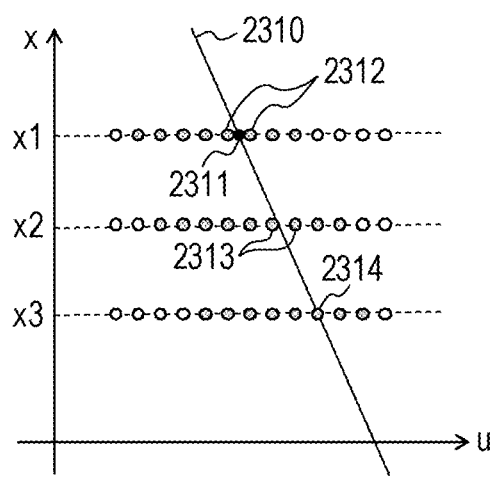

In the direction determination in step S2304, first, a pixel to be corrected is selected from the captured image data, and subsequently, a formula of a straight line on a light field coordinate which passes the pixel to be corrected is obtained in accordance with the method described with reference to FIGS. 11A and 11B and Expressions (8) and (9). This procedure will be described with reference to FIGS. 23B and 23C. FIG. 23B is a diagram illustrating a case where "$d_x$" of FIG. 11A is zero (a case where an x-plane is set as an image capturing plane). FIG. 23C is a diagram illustrating a state in which pixels in the G plane obtained when an object 2303 is captured using image pickup devices C1 to C3 are plotted on the light field coordinate. Although light field data is four-dimensional data in practice, light field data is represented as two-dimensional data for convenience of illustration and an image is displayed in a one-dimensional manner. A pixel 2311 is selected as a pixel to be corrected, a distance $d_{pint}$ is obtained by the distance data input step in step S2303. Furthermore, since the x-plane is set as the image capturing plane, the distance $d_x$ is zero. Furthermore, when a u-plane is located in an arbitrary position on a depth side relative to the object, a distance $d_u$ is also obtained. By this, an inclination $\alpha$ of the straight line of Expressions (8) and (9) may be obtained by calculation. Accordingly, a formula of a straight line 2310 which passes the pixel 2311 may be obtained.

In a neighboring pixel searching step in step S2305, a pixel in the vicinity of the straight line 2310 obtained in the direction determination step in step S2304 is searched for on the light field coordinate. As a searching method, a method for obtaining distances from individual pixels to the straight line 2310 and selecting a pixel corresponding to the smallest distance may be used. As a method for calculating a distance, a formula below may be used, for example.

A distance d from a pixel (u0, x0) to a straight line au+bx+c=0 is represented by the following equation.

$$\frac{|au_0 + bx_0 + c|}{\sqrt{a^2 + b^2}} \quad (21)$$

Note that the formula described above is used for a method for obtaining a distance in two-dimensional data. When a distance is to be actually calculated using light field data, the formula described above is expanded to a four-dimensional formula before calculation.

In the example of FIG. 23C, pixels 2312 are retrieved from image data captured by the image pickup device C1, pixels 2313 are retrieved from image data captured by the image pickup device C2, and a pixel 2314 is retrieved from image data captured by the image pickup device C3.

In a pixel correction step in step S2306, the retrieved pixels 2312, 2313, and 2314 are weighted in accordance with distances from the straight line 2310 and pixel values are added. Note that weights are set such that the individual distances from the straight line 2310 are divided by a sum of the distances of the retrieved pixels so that a sum of the weights becomes 1.

As described above, the process from step S2304 to step S2306 is performed on entire image data for individual pixels to be corrected in the image data. In a corrected light field data outputting step in step S2307, the light field data which has been corrected is output.

As described above, according to this embodiment, the color correction may be performed on pixel signals obtained through the CFA without deteriorating sharpness.

Seventh Embodiment

In a seventh embodiment, a method other than that of the sixth embodiment is employed in a case where color correction is performed on a light field coordinate on the basis of RGB pixel arrangement.

In the sixth embodiment, the method of the color correction performed by the correction processor 2204 has been described. However, in this embodiment, a method of color correction performed by a synthetic image generation unit 2205 will be described.

The synthetic image generation unit 2205 generates a synthetic image in accordance with information on a position of a focus plane, information on a depth of field, and light field data.

FIG. 26 is a diagram illustrating a problem which arises when a synthetic image is generated. Images 2610 to 2612 captured by image pickup devices C1 to C3 have slightly different angles of field. Images 2621 to 2623 are obtained by synthesizing the images 2610 to 2612 and different objects are focused. For example, when the image 2622 is taken as an example, artifacts are generated in blur image regions (objects 2604 and 2606 and a background) which are not focused. This is because the image pickup devices C1 to C3 are discretely disposed, and the artifacts are generated when the images captured by the discretely-disposed image pickup devices C1 to C3 are synthesized.

In order to suppress generation of the artifacts, a portion which is focused and a blur portion are distinguished from each other. It is effective that the blur portion is defocused before the images are synthesized.

In this embodiment, when a refocusing image is obtained through synthesis, the synthetic image generation unit 2205 distinguishes the focused portion and the blur portion at high accuracy on the light field coordinate and different color correction methods are employed for the different portions so that generation of artifacts is suppressed. This method will now be described.

Principle of the operation of this embodiment will be described.

Figure 24A:
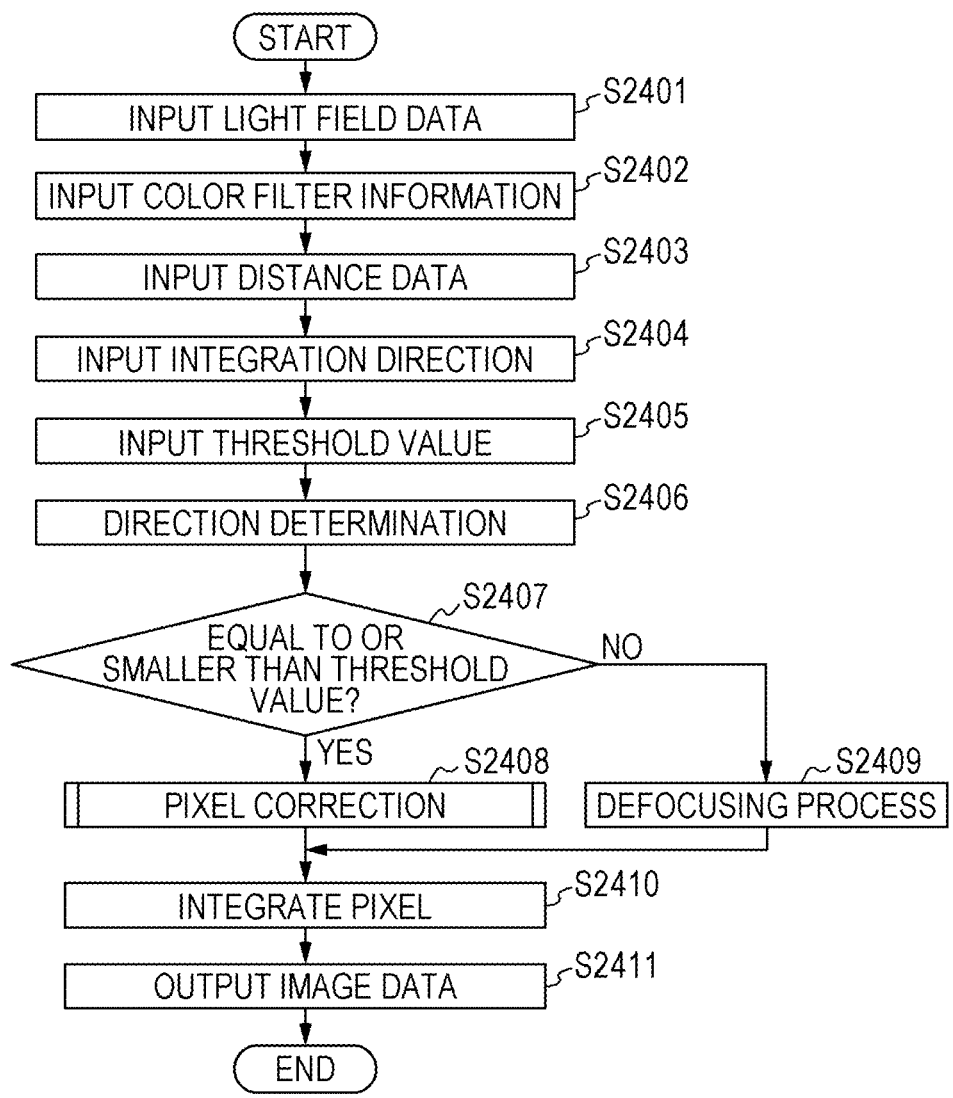
FIGS. 24A to 24C are a flowchart and schematic diagrams illustrating a process according to a seventh embodiment.
Figure 24B:
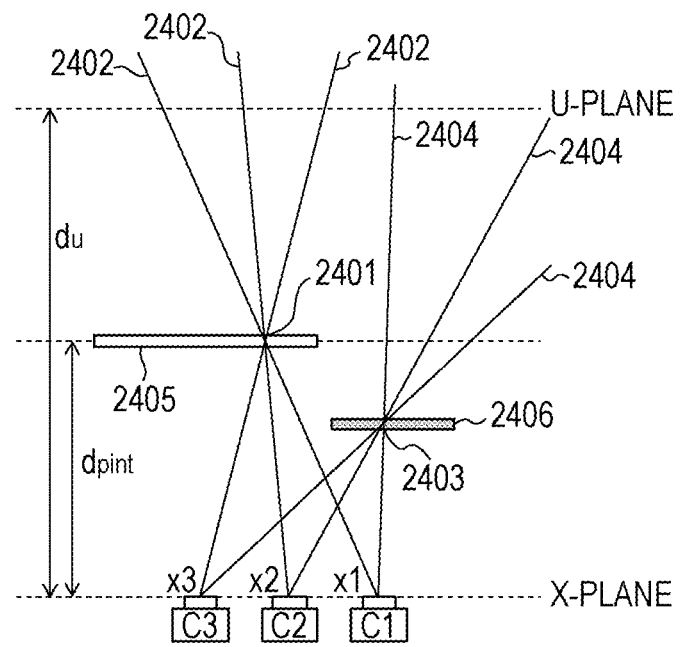

FIG. 24A is a flowchart illustrating the process of this embodiment. In step S2401 to step S2403, light field data, color filter information, and distance data which are to be used in the process are obtained.

In an integration direction input step in step S2404, an integration direction is determined in accordance with a focus position determined by a focus position setting unit 2203 with reference to FIGS. 11A and 11B and Expressions (8) and (9).

In a threshold value input step in step S2405, a threshold value used to distinguish a focused portion from a blur portion is set.

Figure 24C:
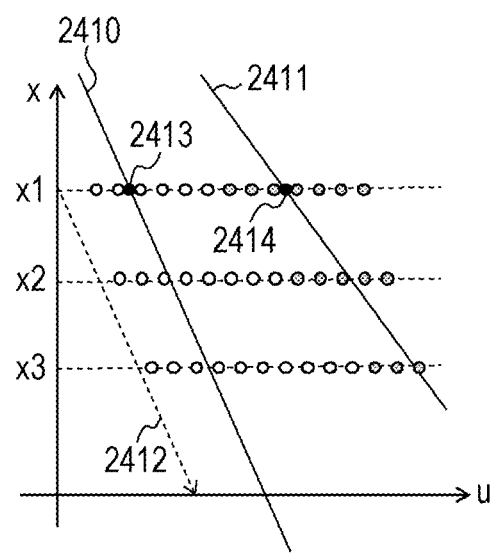

In direction determination in step S2406, a process the same as that performed in the direction determination step S2304 included in the flowchart of the sixth embodiment illustrated in FIG. 23A is performed. FIG. 24C is a diagram illustrating a state in which pixels of a G plane obtained when the objects 2405 and 2406 are captured using image pickup devices C1 to C3 are plotted on a light field coordinate. Although light field data is four-dimensional data in practice, light field data is represented as two-dimensional data for convenience of illustration and an image is displayed in a one-dimensional manner. Here, the integration direction determined in the integration direction input step S2404 is denoted by a reference numeral 2412, a straight line which passes a pixel 2413 calculated in the direction determination step in step S2406 is denoted by a reference numeral 2410, and a straight line which passes a pixel 2414 is denoted by a reference numeral 2411.

In step S2407, inclinations of the integration direction 2412, the straight line 2410, and the straight line 2411 are compared with one another. When the straight line 2410 inclines substantially the same as the integration direction 2412 as illustrated (within the threshold value input in the threshold value input step in step S2405), it is determined that the pixel 2413 corresponds to a portion which is focused after image synthesis. On the other hand, when the straight line 2411 inclines differently from the integration direction 2412 as illustrated (exceeds the threshold value input in the threshold value input step in step S2405), it is determined that the pixel 2414 corresponds to a blur portion.

A pixel which has been determined to be a focused portion is subjected to pixel correction in step S2408. The process described above corresponds to the process in the neighboring pixel searching in step S2305 and the pixel correction step S2306 included in the flowchart of FIG. 23A, and pixels in the vicinity of the straight line 2410 are searched for and are subjected to weighting and addition.

The pixel determined to be a blur portion is subjected to a defocusing process in step S2409. Examples of a method of the defocusing process include a method for calculating an average value of pixels in the vicinity of the pixel 2414 and setting the average value as a correction value and a method using a blur filter.

The process in step S2406 to step S2409 described above is performed on entire image data for individual pixels to be corrected of image data.

In pixel integration in step S2410, the multi-viewpoint image data is subjected to integration along the integration direction determined by the integration direction input step in step S2404.

In an image data output step in step S2411, a synthesized refocusing image is output.

As described above, according to this embodiment, a focused portion and a blur portion are distinguished from each other so that generation of artifacts caused by color correction may be suppressed.

Eighth Embodiment

In an eighth embodiment, a case where a defective pixel is corrected on a light field coordinate on the basis of a position of the defective pixel will be described.

In general, as a method for correcting a defective pixel of an image pickup element, a method for storing a defect position detected in a fabrication process in a ROM and correcting a defective pixel using pixels in the vicinity of the defective pixel has been used.

However, in an image pickup device, such as a Plenoptic camera or a multiple camera, which is capable of obtaining a plurality of multi-view images, correction may be performed at higher accuracy when pixels which are not in the vicinity of the defective pixel are used in some cases. For example, since the multiple camera captures images of an object from different positions, it is highly possible that a defective pixel of a camera is included in image data obtained by another camera. Therefore, when the image data obtained by the other camera is used for correction, high-accurate correction may be performed when compared with a case where pixels in the vicinity of the defective pixel are used for correction. Furthermore, when a Plenoptic camera illustrated in FIGS. 2A and 2B is used, a plurality of light beams emitted from an object may arrive at an image pickup element 210 through different microlenses. Also in this case, as with the multiple camera, when pixels corresponding to the different microlenses which are located far from a defective pixel are used for correction, correction may be performed at higher accuracy when compared with a case where pixels in the vicinity of the defective pixel are used for correction.

In this embodiment, pixels used for correction are searched for on a light field coordinate. As illustrated in FIGS. 4A and 4B, in the light field coordinate, all light beams output from a certain point of an object are included in a straight line. In this embodiment, making use of this fact, a straight line which includes all light beams output from an object corresponding to a pixel to be corrected is obtained, and a plurality of pixels which are included in this straight line or which are located near the straight line are determined to be pixels used for correction. Then weighting and addition are performed on the plurality of calculated pixels so that the correction is performed. When the pixels are included in the straight line or located near the straight line, the pixels correspond to light beams output from the same object or near the object. Accordingly, correction may be performed at higher accuracy when compared with a case where a defective pixel is corrected using pixels in the vicinity of the defective pixel.

FIGS. 22A and 22B are diagrams illustrating main components of an image pickup device according to this embodiment. Only differences from the sixth embodiment will be described. A correction processor 2204 receives, as correction information, a position of a defective pixel from a ROM 2213 and information on a distance to an object from an obtaining unit 2202, and performs correction of a defective pixel on the light field coordinate.

Figure 27:
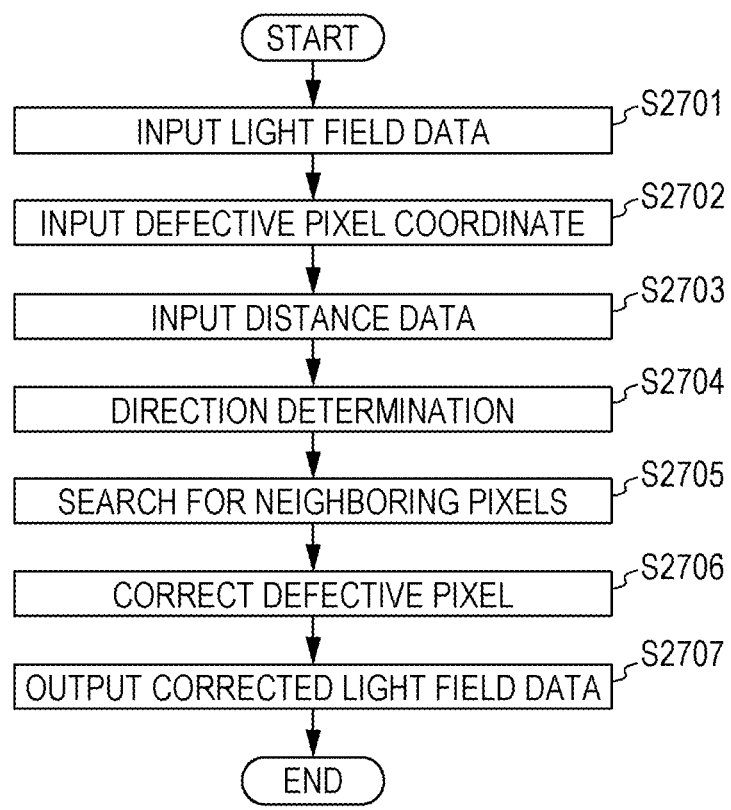
FIG. 27 is a flowchart illustrating a process according to the eighth embodiment.

Operation principle of this embodiment will be described. FIG. 27 is a flowchart illustrating a process performed by the correction processor 2204 of this embodiment. First, in step S2701, light field data is input. Next, in step S2702, a position of a defective pixel is input. Here, the position of the defective pixel is a position on the light field coordinate. Note that the position of the defective pixel may be a position in a sensor. In this case, a light field coordinate is calculated from the position in the sensor before the process proceeds to the next step. In step S2703, distance data is input. Examples of a method for inputting distance data performed in step S2703 include a method for obtaining distance data using a distance measurement sensor disposed in an image pickup unit 101, a method for obtaining distance data using an image pickup device for distance measurement, and a method for generating distance data using light field data which has been described in the fifth embodiment. Among these methods, when distance information is generated from light field data, the blur correction unit 2204 is not required to obtain information on a distance to the object from the obtaining unit 2202.

In FIG. 28, examples of captured image data and distance image data which are to be used in this process are shown. Only the captured image data of a G plane is shown in FIG. 28 and one of pixels is a defective pixel. In this embodiment, a pixel value of the defective pixel is obtained through correction. As a value of the distance image data becomes small (dark), an object corresponding to the data is located in a far distance.

In direction determination in step S2704, first, for the position of the defective pixel obtained in step S2702, a formula of a straight line on the light field coordinate which passes the defective pixel is obtained in accordance with the method the same as used in step S2304. Hereafter, neighboring pixel retrieval in step S2705 and pixel correction in step S2706 are performed similarly to the processes in step S2305 and step S2306, respectively, so that the defective pixel is corrected.

The process from step S2704 to step S2706 is thus performed on all defective pixels. In a corrected light field data outputting step in step S2707, the light field data which has been corrected is output.

Note that, although the case where the image pickup unit 101 is a multiple camera has been described in this embodiment, even when the image pickup unit 101 is a device capable of obtaining light field data, such as a Plenoptic camera, the similar correction may be performed.

As described above, according to this embodiment, correction of a defective pixel may be realized at high accuracy.

Ninth Embodiment

As described above, when a Plenoptic camera or a multiple camera is used, light field data having information on directions and luminance of light beams may be obtained. However, information on directions and luminance of light beams generally include noise, and it is not necessarily the case that ideal light field data is obtained. Therefore, in this embodiment, noise included in information on luminance of light beams in light field data is focused, and a case where a noise reduction process is performed on information on luminance of light beams on a light field coordinate will be described.

In general, a process of reducing noise of luminance of image data is performed by performing a filter process such as a smoothing filter or a median filter. When such a noise reduction process using a filter process is performed on image data, images blur and sharpness is deteriorated.

Furthermore, as a method of a process of reducing noise of multi-view images captured by a Plenoptic camera or a multiple camera, a method using an image captured in another viewpoint has been proposed. Compositions of multi-view images captured by a Plenoptic camera and a multiple camera are substantially the same as each other although angles of field are slightly different from one another. Therefore, it is highly possible that pixels of certain image data corresponding to a certain object are included in image data of another viewpoint. Accordingly, the pixels corresponding to the certain object are searched for in images of different viewpoints and weighted average of luminance of the pixels is obtained so that noise reduction which causes reduction of generation of a blur is performed. However, in a case where a plurality of objects which have similar shapes and similar patterns are included, when pixels corresponding to a certain object are searched for in a plurality of viewpoint images, matching error occurs, and accordingly, a blur may be generated or artifacts may occur.

In this embodiment, pixels corresponding to a certain object are searched for on a light field coordinate. As illustrated in FIGS. 4A and 4B, in the light field coordinate, all light beams output from a certain point of an object are included in a straight line. In this embodiment, this characteristic is utilized when a certain point in the light field data is subjected to reduction of noise of luminance information. The noise reduction process is performed as follows. First, a straight line which includes light beams output from an object corresponding to a point of interest is obtained in a light field space, and thereafter, a weighted average of luminance of light field data distributed on the straight line is obtained. Since the light field data distributed on the straight line corresponds to the light beams output from the same object, matching error does not occur, and the noise reduction process may be performed without generation of a blur and artifacts.

The image pickup device according to this embodiment includes components the same as those illustrated in FIGS. 22A and 22B. Only differences from the sixth and eighth embodiments will be described. A correction processor 2204 receives, as correction information, information on a distance to an object from a ROM 2213 and performs the noise reduction process on the light field coordinate. Here, the distance information may be obtained by one of various methods including a method for obtaining distance information using a distance measurement sensor disposed in an image pickup unit 2201, a method for obtaining distance information using an image pickup device for distance measurement, and a method for calculating distance information in accordance with an inclination of light field data which has been described in the fifth embodiment. The ROM 2213 records the distance information obtained by one of the methods.

An operation of the correction processor 2204 of this embodiment will be described.

Figure 29A:
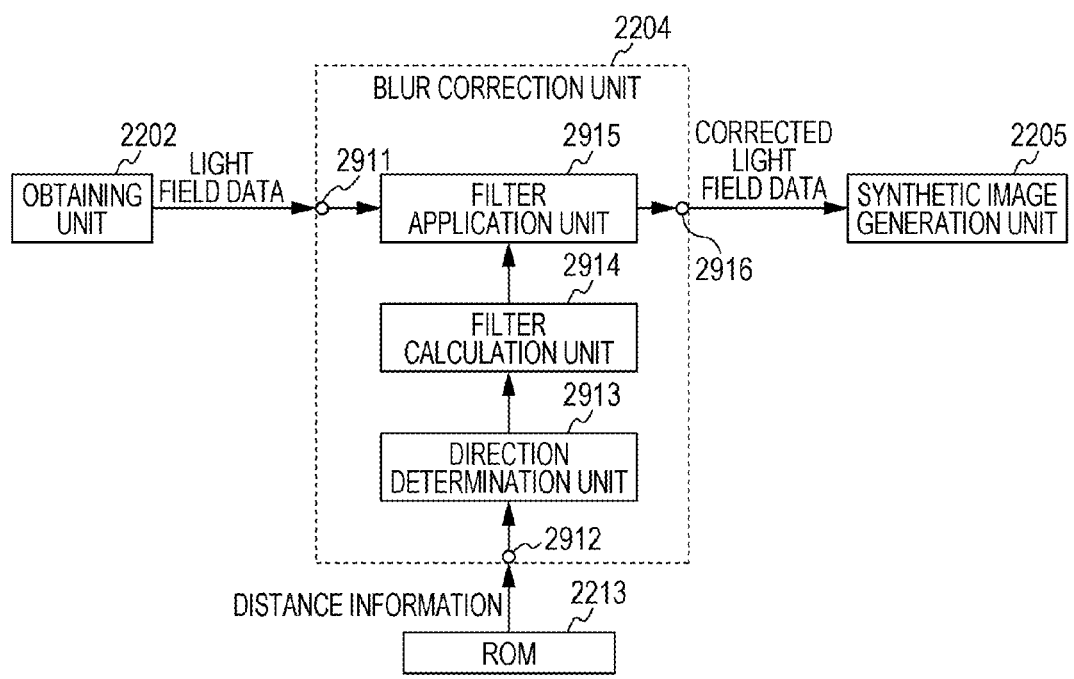
FIGS. 29A and 29B are a schematic diagram and a flowchart illustrating a process according to the ninth embodiment.

FIG. 29A is a diagram illustrating components of the correction processor 2204 according to this embodiment. The correction processor 2204 mainly includes a direction determination unit 2913, a filter calculation unit 2914, and a filter application unit 2915. Hereinafter, the units will be described.

The direction determination unit 2913 obtains a formula of a straight line which passes a point of interest in a light field space in accordance with distance information supplied from the ROM 2213.

The filter calculation unit 2914 calculates a noise reduction filter in accordance with direction information supplied from the direction determination unit 2913.

The filter application unit 2915 applies the noise reduction filter calculated by the filter calculation unit 2914 to luminance included in light field data input from a light field data input terminal 2911. Then the corrected light field data is output to a synthetic image generation unit 2205 through a corrected light field data output unit 2916.

Note that a method for fabricating the noise reduction filter and a method for applying a filter will be described in detail hereinafter.

Figure 29B:
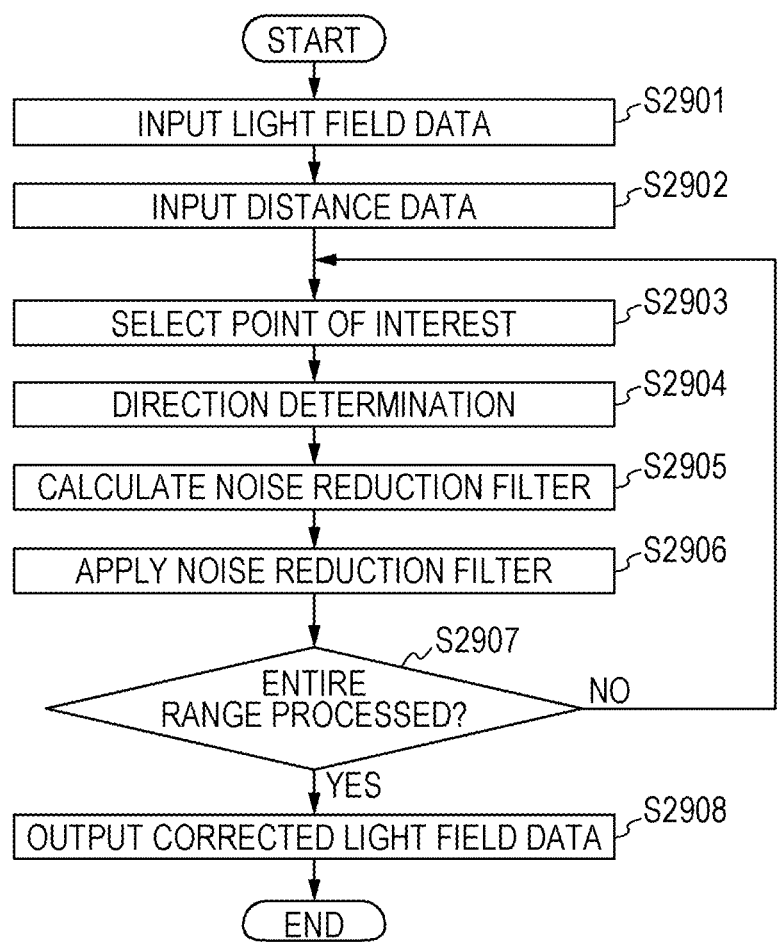

FIG. 29B is a flowchart illustrating the process performed by the correction processor 2204. The correction processor 2204 first inputs light field data and distance data to be used in the process (in step S2901 and step S2902).

Subsequently, in step S2903, data which is included in the light field data obtained in step S2901 and which has not subjected to the noise reduction process is selected and set as a point of interest. In the process from step S2903 to step S2906 described below, the noise reduction process is performed on the point of interest selected in this step. Then the process from step S2903 to step S2906 is repeatedly performed until noise reduction of the entire light field data is completed.

In step S2904, the direction determination unit 2913 calculates an inclination of a straight line which passes the point of interest on the light field coordinate in accordance with a distance to an object corresponding to the point of interest. This procedure is the same as that of the direction determination in step S2304 of the sixth embodiment. According to the method described with reference to FIGS. 11A and 11B and Expressions (8) and (9), the formula of the straight line which passes the point of interest on the light field coordinate is obtained in accordance with the distance data obtained in step S2902. Note that, in Expressions (8) and (9), the distance to the object corresponding to the point of interest is used instead of the value $d_{pint}$.

In step S2905, the filter calculation unit 2914 calculates a noise reduction filter in accordance with the direction of the straight line obtained in step S2904. This process will be described in detail hereinafter.

Next, in step S2906, the filter application unit 2915 applies the noise reduction filter calculated in step S2905 to luminance of the point of interest of the light field data and surrounding luminance. This process will be also described in detail hereinafter.

In step S2907, it is determined whether the noise reduction process has been performed on an entire range of the light field data. When the determination is affirmative, the process proceeds to step S2908, and otherwise, the process returns to step S2903.

In step S2908, the light field data which has been subjected to the noise reduction is output to the synthetic image generation unit 2205 through the corrected light field data output unit 2916.

The operation of the correction processor 2204 of this embodiment is thus completed.

Process of Filter Calculation Unit

Figure 30:
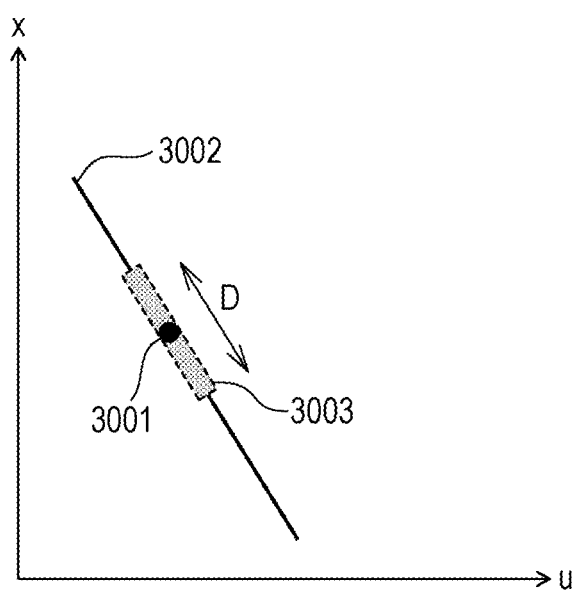
FIG. 30 is a diagram schematically illustrating a filter applicable range in a light field coordinate according to the ninth embodiment.

Hereinafter, an operation of the filter calculation unit 2914 will be described with reference to FIG. 30. In FIG. 30, a reference numeral 3001 denotes a point of interest to be subjected to the noise reduction process. Furthermore, a reference numeral 3002 denotes a straight line which passes the point of interest on the light field coordinate obtained by the direction determination unit 2913. A shaded portion 3003 represents a range to which the noise reduction filter is applied. As denoted by the shaded portion 3003, a filter to be applied to data on the straight line obtained by the direction determination unit 2913 which includes the point of interest at the center is calculated.

In this process, any filter may be used as long as the filter performs the noise reduction on a straight line in a light field space. For example, a Gaussian filter having a coefficient corresponding to a distance from a point of interest on a straight line may be used. When the Gaussian filter is used, a filter coefficient f(u, v, x, y) is represented by an equation below in accordance with a distance d from the point of interest on the straight line with respect to a group of (u, v, x, y) which satisfies Expressions (8) and (9). Note that "δ" denotes a delta function. Furthermore, the filter has a value in a range $-D/2 \le d \le D/2$ using a value of a distance D set in advance.

$$f'(u, v, x, y) = \delta\left(\left(1 - \frac{1}{\alpha}\right)x + \frac{U}{\alpha}\right) \times$$

$$\delta\left(\left(1 - \frac{1}{\alpha}\right)y + \frac{V}{\alpha}\right) \times \exp\left\{-\frac{d(u, v, x, y)^2}{2\sigma^2}\right\}^{(-D/2 \le d \le D/2)}$$

$$f(u, v, x, y) = \frac{1}{A} f'(u, v, x, y)$$

$$A = \int f'd(u, v, x, y) dx dy$$

(22)

In the equation above, assuming that a coordinate of the point of interest on the light field coordinate is (u', v', x', y'), the distance d is represented by the following equation.

$$d(u,v,x,y) = \sqrt{(u'-u)^2 + (v'-v)^2 + (x'-x)^2 + (y'-y)^2} \quad (23)$$

Figure 31A:
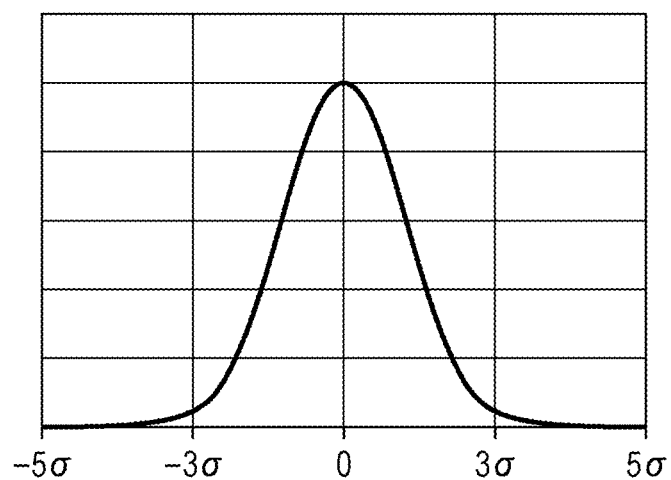
FIGS. 31A and 31B are diagrams schematically illustrating a filter and filter application according to the ninth embodiment.
Figure 31B:
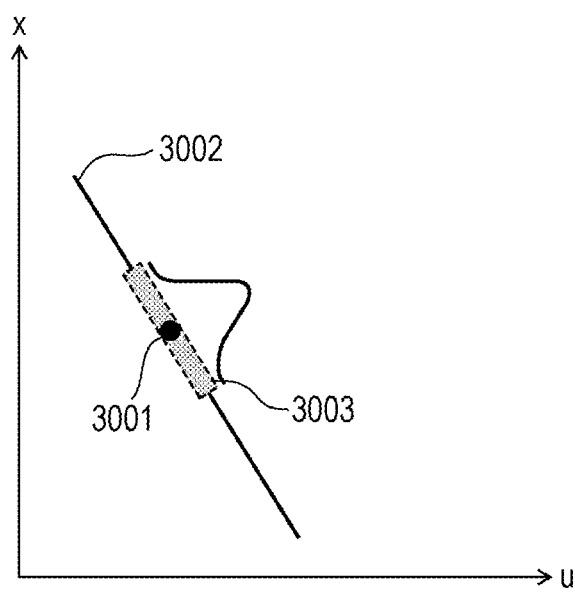

Note that, although the light field space is represented as a two-dimensional light field space in FIG. 30 for convenience of description, the light field space is represented as four-dimensional data in practice, and similarly, the filter calculated in this process is also represented as a four-dimensional filter. FIG. 31A is a diagram illustrating the Gaussian filter in accordance with the distance from the point of interest on the straight line. Furthermore, FIG. 31B is a diagram illustrating a state in which the filter of FIG. 31A is applied to the range 3003 including the point of interest 3001 at the center. The filter is thus applied to the range including the point of interest on the straight line in the light field space to thereby perform the noise reduction.

In the foregoing description, the case where the smoothing filter is used is taken as an example. However, other filters may be employed. Any filter may be used for the noise reduction as long as the filter performs noise reduction on a straight line which passes a point of interest on a light field coordinate, and a filter functions in accordance with a function other than the function represented by Expression (22) may be used or a noise reduction filter such as a median filter may be used.

Process of Filter Application Unit

Hereinafter, an operation of the filter application unit 2915 will be described. The filter application unit 2915 applies the filter calculated by the filter calculation unit 2914 to data on the straight line which passes the point of interest included in the light field data as described above.

Assuming that a coordinate of the point of interest on the light field coordinate is (u', v', x', y') and luminance of the light field data which has not been corrected is represented by "L", luminance L' of corrected light field data is calculated in accordance with the following equation using a noise reduction filter f(u, v, x, y).

$$L'(u',v',x',y') = \iiiint L(u'-u,v'-v,x'-x,y'-y) \times f(u,v,x,y) \, du \, dv \, dx \, dy = \iiiint L(u'-((1-1/\alpha)x+U/\alpha), v'-((1-1/\alpha)y+V/\alpha), x'-x, y'-y) \times f((1-1/\alpha)x+U/\alpha, (1-1/\alpha)y+V/\alpha, x, y) \, dx \, dy \quad (24)$$

The operation of the correction processor 2204 of this embodiment has been described hereinabove.

As described above, in this embodiment, a direction of a straight line including points are determined in a light field space and noise reduction is performed along the straight line. As described above, since all light beams output from a certain point of an object are included in a straight line in a light field space, data on the straight line corresponds to light beams output from a point of the same object. Accordingly, searching of corresponding points in a plurality of images by block matching is not required and a determination error does not occur in the searching of corresponding points, and accordingly, noise reduction is performed without generating a blur and artifacts due to a determination error.

Tenth Embodiment

In a tenth embodiment, a process of correcting an error of light field data caused by a fabrication error relative to a designed value at a time of fabrication of an image pickup device or deformation of an image pickup device after fabrication will be described.

The light field data is generated by distinguishing directions of light beams obtained through a microlens array 206 and mapping the light beams on a light field coordinate. In this case, the directions of the obtained light beams are distinguished in accordance with the designed value of the image pickup device including an installation position of a microlens. Also in a multiple camera or multi-view image capturing, a camera maps an obtained light beam in accordance with parameters of a position and orientation of the camera so as to generate light field data. Using the generated light field data, the blur correction according to the first embodiment, the color correction according to the seventh embodiment, the defective pixel correction according to the eighth embodiment, the noise reduction according to the ninth embodiment, and the like may be performed.

However, when a difference from a designed value of an image pickup device is generated due to a fabrication error of the image pickup device or deformation of the image pickup device after fabrication, a light beam is not accurately mapped on the light field coordinate, and accordingly, a mapping error is included in the light field data. In the case of a multiple camera or multi-view image capturing, when a position and orientation of a camera is not reliably obtained, a mapping error is similarly included in light field data. The mapping error causes distortion of light field data. When the distorted light field data is used, effects of processes in a later stage are considerably reduced.

In this embodiment, light field data including a mapping error caused by a difference between an actual image pickup device and a designed value is corrected so that light field data which is accurately mapped on a light field coordinate is obtained.

Shift from Designed Value of Image Pickup Device on Light Field Coordinate

Figure 32A:
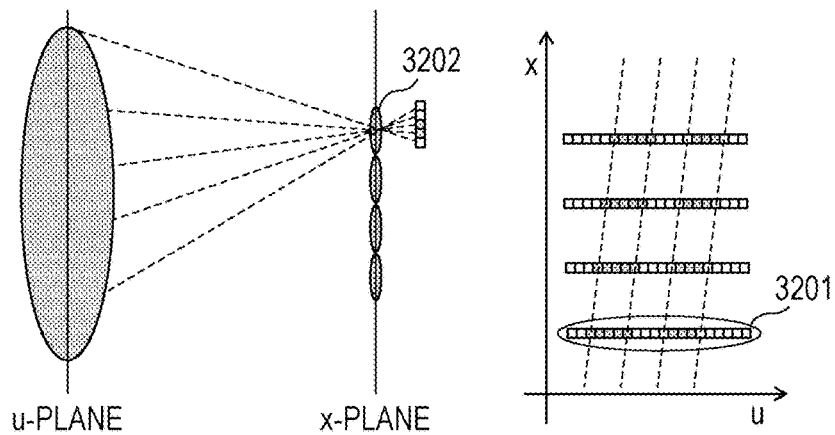
FIGS. 32A to 32C are diagrams illustrating the relationship between a shift from a designed value of an image pickup device and light field data according to a tenth embodiment.
Figure 32B:
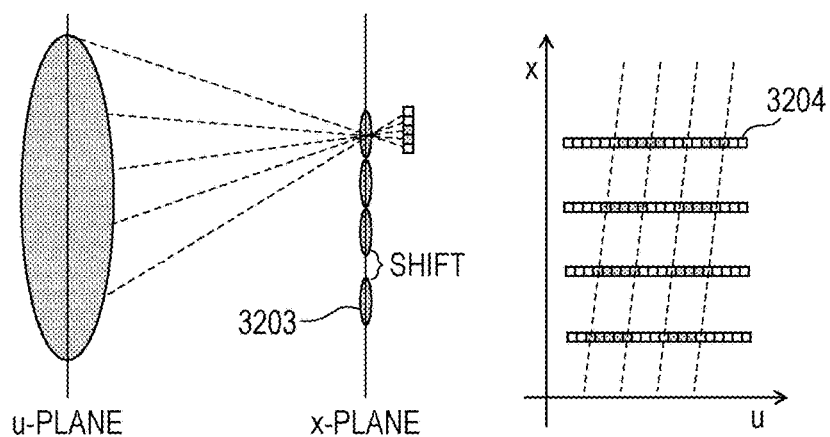
Figure 32C:
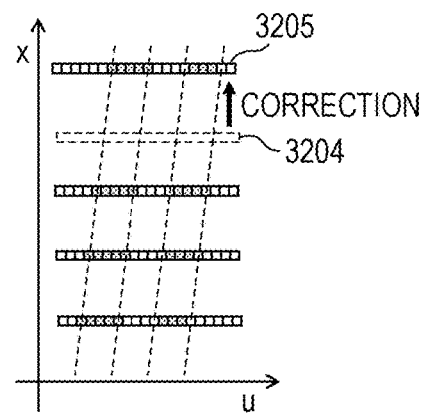

Here, a case where the difference from the designed value of the image pickup device affects the light field data will be described. A concept diagram is illustrated in FIGS. 32A to 32C. For simplicity of description, it is assumed that a plane in which a main lens of a Plenoptic camera is located corresponds to a u-plane, a plane in which a microlens array is located corresponds to an x-plane, and a four-dimensional space is represented as a two-dimensional space.

Light field data is generated in accordance with the designed value of the image pickup device. If microlenses of the image pickup device are disposed in a position designed by the designed value, the generated light field data satisfies the characteristic of light field data in which all light beams output from a certain point of an object are included in a straight line on a light field data. FIG. 32A is a diagram illustrating lens arrangement in a case where the microlenses of the image pickup device are disposed in positions set by the designed value and obtained light field data. It is apparent that light beams output from a certain point of an object are included in a straight line. Here, light field data surrounded by a circle 3201 on the light field coordinate is obtained by mapping the light beams which pass a microlens 3202 on the light field coordinate. As illustrated, the obtained light beams which pass the microlenses are aligned on a straight line parallel to a u-axis on the light field coordinate. Hereinafter, data of the light beams obtained through the microlenses and mapped on the light field coordinate is referred to as "sub-light field data".

FIG. 32B is a diagram illustrating lens arrangement in a case where a microlens of the image pickup device is disposed in a position shifted from the designed value and obtained light field data. In FIG. 32B, a microlens 3203 is shifted from the designed value downward in the drawing. However, light field data is generated by mapping light beams on a light field coordinate in accordance with the designed value. Therefore, light beams which pass the microlens 3203 are mapped in positions represented by a reference numeral 3204 similarly to the case in which the microlens is disposed as the designed value as illustrated in FIG. 32A. It is recognized that a straight line estimated from sub-light field data obtained by microlenses other than the microlens 3203 is shifted from sub-light field data obtained by the microlens 3203. The shift causes distortion of light field data. The shift is generated in the x-plane in the lens configuration diagram and may be corrected by shifting the sub-light field data of the microlens 3203 in an x-axis direction. A concept diagram of correction of light field data is illustrated in FIG. 32C. Specifically, the sub-light field data of the microlens 3203 is shifted in parallel along the x axis direction from the position 3204 to a position 3205. By this, light field data which satisfies the characteristic in which all light beams output from a certain point of an object are included in a straight line on a light field coordinate may be obtained.

Correction of Light Field Data

Figure 33A:
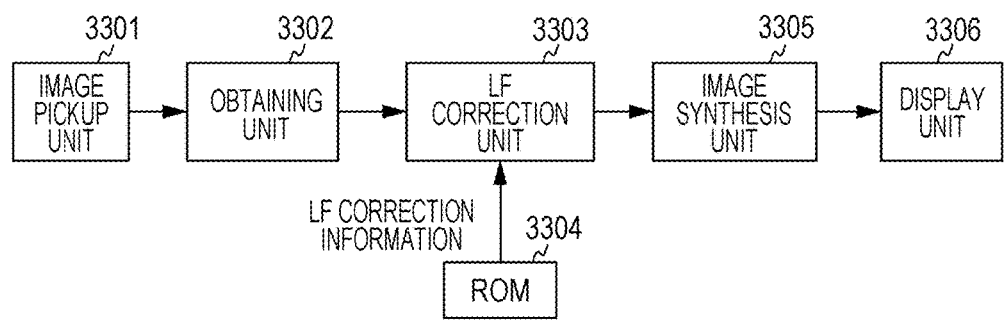
FIGS. 33A and 33B are diagrams illustrating main components of an information processing system according to the tenth embodiment.

FIG. 33A is a block diagram illustrating an internal configuration of an image processing unit according to the tenth embodiment. A process performed by an LF correction unit 3303 of this embodiment will be described in detail.

To the LF correction unit 3303, light field data is supplied from an LF obtaining unit 3302 and an LF-correction-parameter searching range is supplied as LF correction information from a ROM 3304.

Figure 33B:
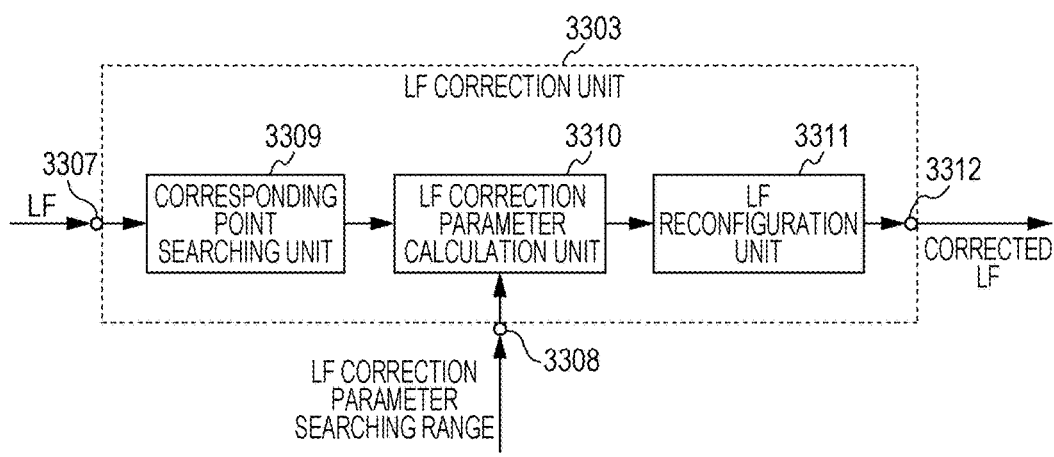

FIG. 33B is a block diagram illustrating an internal configuration of the LF correction unit 3303.

A light field data input terminal 3307 supplies light field data obtained by the LF obtaining unit 3302 to a corresponding-point searching unit 3309.

An LF correction information input terminal 3308 supplies the LF-correction-parameter searching range used for correction of light field data to an LF correction parameter calculation unit 3310.

Figures 34A, 34B:
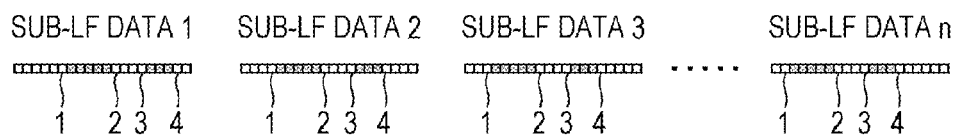
FIGS. 34A and 34B are diagrams illustrating resultant images obtained after corresponding-point searching and a data group according to the tenth embodiment.

The corresponding-point searching unit 3309 extracts sub-light field data representing information on light beams which have been obtained through the microlenses from the light field data obtained by the LF obtaining unit 3302 and performs a corresponding-point searching process among extracted sub-light field data. In this embodiment, first, feature-point extraction is performed on the extracted sub-light field data by edge extraction or the like. By performing a block matching process mainly using extracted feature points, the corresponding-point searching is performed on the sub-light field data. Although the method described above is used in this embodiment, the method of the corresponding-point searching is not limited to this. FIG. 34A is a diagram illustrating a result of the corresponding-point searching performed on a plurality of sub-light field data extracted from the light field data. FIG. 34B is a diagram illustrating a data group obtained as a result of the corresponding-point searching. Here, "n" denotes the number of extracted sub-light-field data and "m" denotes the number of corresponding points. The variable n represents the number of microlenses included in the image pickup device. Since upper 20 corresponding-point searching results are used for processes in a later stage, the variable m is 20. However, a value of the variable m is not limited to this.

The LF correction parameter calculation unit 3310 calculates LF correction parameters such that an error of corresponding-point searching results relative to an approximate line calculated from the corresponding-point searching results becomes smallest using the corresponding-point searching results and the LF-correction-parameter searching range as input. The LF correction parameters to be calculated will be described. The LF correction parameters according to this embodiment represent amounts of movements of the sub-light-field data. As illustrated in FIG. 32C, the light field data is corrected by moving the sub-light-field data of the microlenses. FIG. 35A is a concept diagram of the LF correction parameters. FIG. 35B is a diagram illustrating a data group obtained by adding the LF correction parameters to the data group obtained as the results of the corresponding-point searching illustrated in FIG. 34B. Note that "p1", "p2", "p3", and "p4" represent the LF correction parameters of the microlenses. Furthermore, a variable "range" illustrated in FIG. 35A represents a possible range of values of the LF correction parameters and may be calculated in advance. This is because a maximum shift width of a position of a microlens disposed in the image pickup device serving as a source of the LF correction parameters may be estimated at a stage of design of the image pickup device in accordance with a size of the image pickup device and arrangement of the microlens array. An LF correction parameter p is included in a range represented by Expression (25). In this embodiment, a value of the variable "range" is 20. However, the value of the variable "range" is not limited to this.

$$-\frac{\text{range}}{2} \leq p \leq \frac{\text{range}}{2} \quad (25)$$

In this embodiment, the LF-correction-parameter searching range "range" is calculated in advance in accordance with the maximum shift width of a position of a microlens estimated from an estimated fabrication error and is stored in the ROM 3304. LF correction parameters within the searching range are obtained.

Subsequently, a method for obtaining an approximate line from the corresponding-point searching results and calculating the LF correction parameters will be described. In this embodiment, an approximate line of the corresponding-point searching results obtained by the corresponding-point searching unit 3309 is obtained by least squares, and an LF correction parameter corresponding to the smallest sum of errors between the calculated approximate line and the corresponding points is obtained.

First, an approximate line is calculated using the corresponding-point searching results obtained by the corresponding-point searching unit 3309 on the light field coordinate. An equation for calculating an approximate line using the corresponding-point searching results is represented as Expression (26). Here, "n" denotes the number of sub-light-field data, "i" denotes a variable representing sub-light-field data of the microlenses, and "j" denotes a variable representing a corresponding-point number. According to Expression (26), an approximate line of a corresponding-point group may be calculated from n j-th corresponding points on the light field coordinate.

$$x = a_j u + b_j \quad (26)$$

$$a_j = \frac{\sum_{i=1}^{n}(u_i^j * x_i^j) - \frac{\sum_{i=1}^{n} u_i^j * \sum_{i=1}^{n} x_i^j}{n}}{\sum_{i=1}^{n}(u_i^j * u_i^j) - \frac{\sum_{i=1}^{n} u_i^j * \sum_{i=1}^{n} x_i^j}{n}}$$

$$b_j = \frac{\left(\sum_{i=1}^{n} x_i^j - a * \sum_{i=1}^{n} u_i^j\right)}{n}$$

Although the least squares is used for calculation of an approximate line in this embodiment, a method for calculating an approximate line is not limited to this. For example, a Ransac method used for calculating an approximate line without using outliers may be employed.

Figure 36:
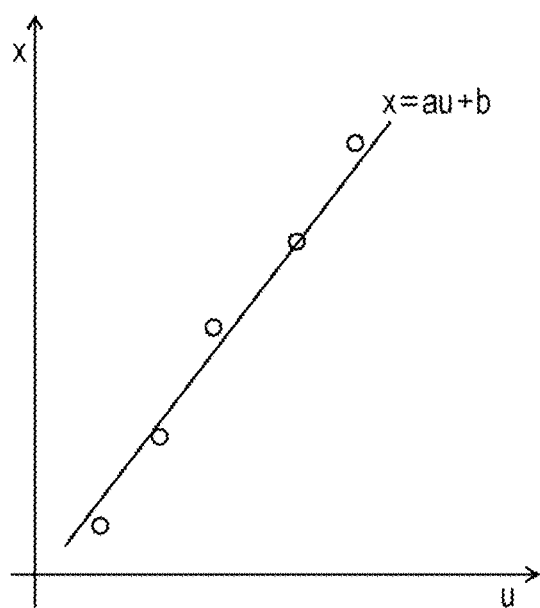
FIG. 36 is a diagram illustrating the relationship between an approximate line and corresponding points according to the tenth embodiment.

Next, an error between the approximate line and the n j-th corresponding points is calculated. The relationship between the approximate line and the corresponding points is shown in FIG. 36. A sum dj of square of an error between the approximate line and n j-th corresponding points may be calculated by Expression (27).

$$d_j = \sum_{i=1}^{n} (x_i^j + p_i - a_j u_i^j - b_j)^2 \qquad (27)$$

Accordingly, a sum d of errors between the approximate line and all the m corresponding points may be obtained by Expression (28).

$$d = \sum_{j=1}^{m} \sum_{i=1}^{n} (x_i^j + p_i - a_j u_i^j - b_j)^2 \qquad (28)$$

The LF correction parameter calculation unit 3310 calculates sums d of errors of combinations of all the LF correction parameters p included in the searching range, sets one of the combinations of the parameters which has the smallest error sum d as LF correction parameters, and outputs the LF correction parameters to an LF reconfiguration unit 3311. Although the LF correction parameters are calculated by the method described above in this embodiment, the calculation method is not limited to this. For example, an optimization process such as a steepest descent method or a Levenberg-Marquardt method may be used.

The LF reconfiguration unit 3311 reconfigures light field data in accordance with the LF correction parameters calculated by the LF correction parameter calculation unit 3310. The reconfiguration of light field data may be performed by moving sub-light-field data of the microlenses by the LF correction parameters in the x-axis direction.

A light field data output terminal 3312 outputs the light field data generated by the LF reconfiguration unit 3311 to an image synthesis unit 3305.

Flow of Process of LF Correction Unit in Tenth Embodiment

A process performed by the LF correction unit 3303 of this embodiment will be described.

Figure 37:
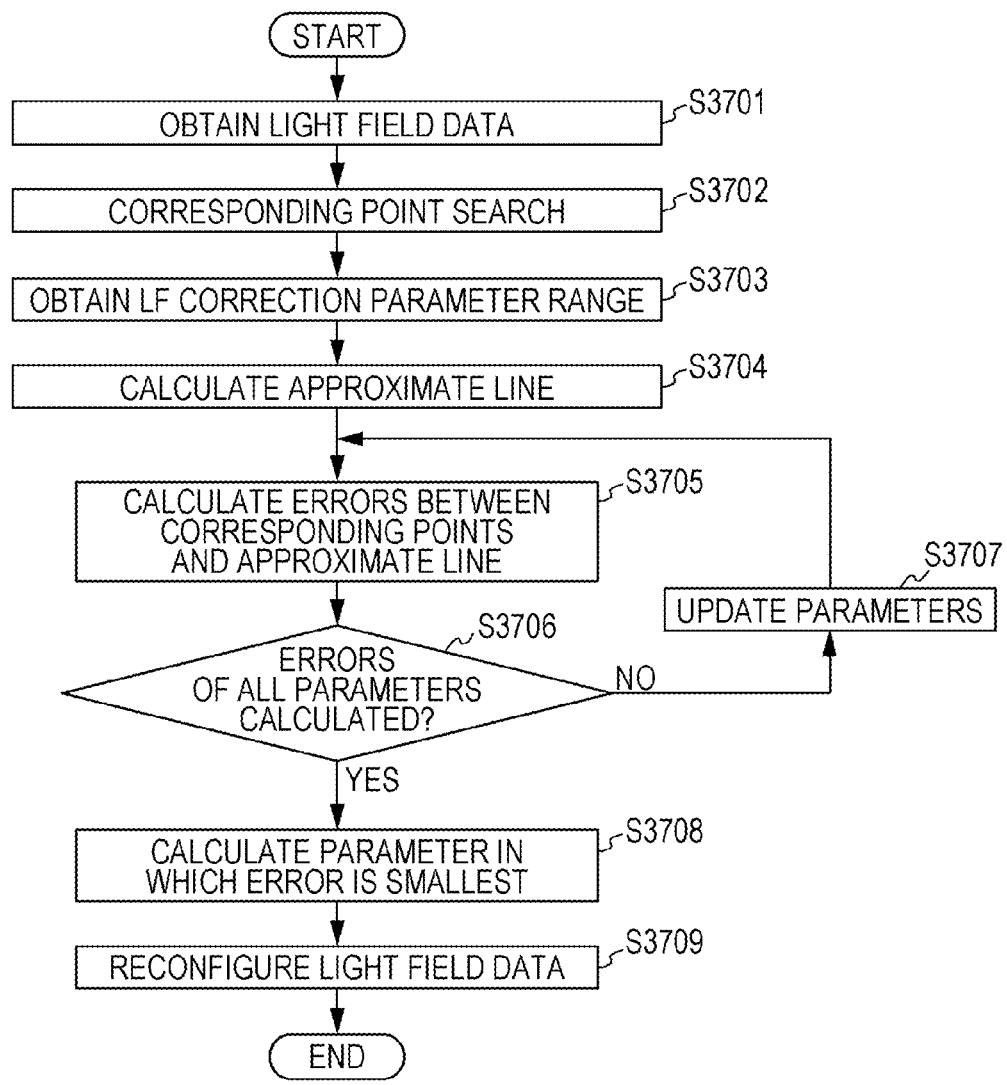
FIG. 37 is a flowchart illustrating a process performed by an LF correction unit according to the tenth embodiment.

FIG. 37 is a flowchart illustrating the process performed by the LF correction unit 3303.

In step S3701, the corresponding-point searching unit 3309 obtains light field data through the light-field-data input terminal 3307.

In step S3702, the corresponding-point searching unit 3309 extracts sub-light-field data obtained by the microlenses from the obtained light field data and performs the corresponding-point searching on the extracted sub-light-field data. Results of the corresponding-point searching are supplied to the LF correction parameter calculation unit 3310.

In step S3703, the LF correction parameter calculation unit 3310 obtains a searching range of LF correction parameters as LF correction information through the LF correction information input terminal 3308.

In step S3704, the LF correction parameter calculation unit 3310 calculates an approximate line which connects the results of the corresponding-point searching performed by the corresponding-point searching unit 3309 in accordance with Expression (26).

In step S3705, the LF correction parameter calculation unit 3310 calculates errors between corresponding points and the approximate line using Expression (28). Note that the LF correction parameters correspond to one of combinations of parameters included in the LF-correction-parameter searching range obtained by the LF correction information input terminal 3308.

In step S3706, it is determined whether errors of combinations of all the parameters included in the LF-correction-parameter searching range have been calculated. When the determination is affirmative, the process proceeds to step S3708, and otherwise, the process proceeds to step S3707.

In step S3707, the parameters from which errors are to be calculated are updated by combinations of parameters in which evaluation values have not been calculated among the combinations of parameters included in the LF-correction-parameter searching range. By this parameter update, the sub-light-field data of the microlenses moves and positions of corresponding points are changed.

In step S3708, the LF correction parameter calculation unit 3310 obtains a combination of LF correction parameters corresponding to the smallest error among the errors calculated by the combinations of all the parameters included in the LF-correction-parameter searching range. The combination is supplied to the LF reconfiguration unit 3311 as LF correction parameters.

In step S3709, the LF reconfiguration unit 3311 reconfigures light field data by rearranging the light beams obtained by the microlenses in accordance with the obtained LF correction parameters.

Figure 38A:
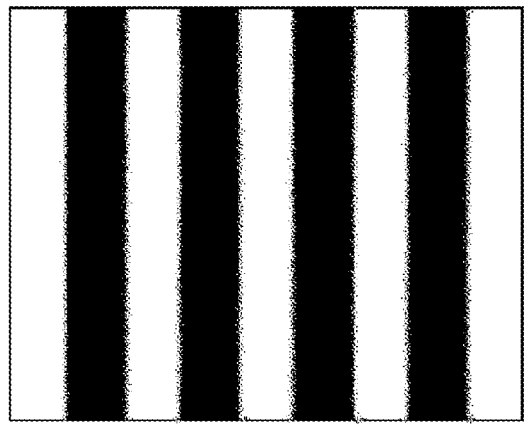
FIGS. 38A and 38B are diagrams illustrating effects of the tenth embodiment.
Figure 38B:
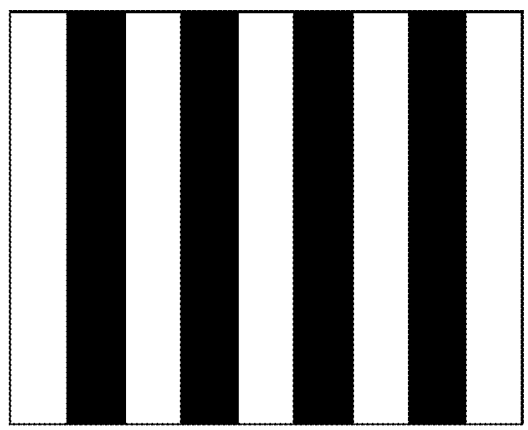

FIGS. 38A and 38B are diagrams illustrating effects obtained when the image processing according to this embodiment is performed. Images are generated by synthesizing pixels on the straight line of the light field data with one another.

FIG. 38A is a diagram illustrating a result of an image generated on the basis of the light field data including the errors as illustrated in FIG. 32B. The image blurs at edge portions. This is because light beams emitted from different positions are determined as light beams emitted from the same position and used for synthesis. Since the microlenses are arranged in a shift manner, white portions are included in pixels on the straight line which should be all black portions, and therefore, blurs occur at the edge portions.

FIG. 38B is a diagram illustrating a result of an image generated through synthesis on the basis of light field data which does not include errors according to this embodiment. Blurs at the edge portions are avoided. This is because all pixels on a straight line have the same color through correction of the light field data.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-124985 filed May 31, 2012 and No. 2013-044407 filed Mar. 6, 2013, which are hereby incorporated by reference herein in their entirety.

The invention claimed is:

1. An information processing apparatus, comprising:
a processor; and
a memory coupled to the processor, the memory having instructions that, when executed by the processor, perform operations comprising:
obtaining light field data representing directions and intensity of light beams emitted from an object to an image pickup unit;
correcting the light field data on a coordinate of the light field data; and
generating image data from the corrected light field data,
wherein the light beams pass different parts of a lens so that the directions are distinguished, and
wherein the image data is obtained by performing integration in a certain direction on the light field data on the light field coordinate.

2. The information processing apparatus according to claim 1, wherein the correcting corrects the light field data in accordance with information representing a factor of influence given to an image corresponding to the image data.

3. The information processing apparatus according to claim 2, wherein the information representing a factor of influence given to an image is information on a blur.

4. The information processing apparatus according to claim 3, wherein the correcting calculates a blur filter using the information on a blur and performs deconvolution.

5. The information processing apparatus according to claim 2, wherein the information on a factor of influence given to an image is information on aberration of an optical system of the image pickup unit.

6. The information processing apparatus according to claim 2, wherein the information representing a factor of influence given to an image is information on an RGB pixel arrangement.

7. The information processing apparatus according to claim 6, wherein the correcting performs color correction on the light field coordinate on the basis of the pixel arrangement and distance data.

8. The information processing apparatus according to claim 2, wherein the information representing a factor of influence given to an image is information on a position of a defective pixel.

9. The information processing apparatus according to claim 8, wherein the correcting corrects the defective pixel on the light field coordinate based on the position of the defective pixel.

10. The information processing apparatus according to claim 2, wherein the information representing a factor of influence given to an image is information on a direction of a straight line on the light field coordinate.

11. The information processing apparatus according to claim 10, wherein the correcting reduces noise on the light field coordinate in accordance with the information representing a direction of a straight line on the light field coordinate.

12. The information processing apparatus according to claim 2, wherein the information representing a factor of influence given to an image is information on an amount of distortion of the light field data.

13. The information processing apparatus according to claim 12, further comprising:
searching the light field data for corresponding points.

14. The information processing apparatus according to claim 13, wherein the searching evaluates shifts between a line calculated from the corresponding points of the light field data and the corresponding points.

15. The information processing apparatus according to claim 1, wherein the correcting corrects a frequency characteristic of the light field data.

16. The information processing apparatus according to claim 1, further comprising:
obtaining distance image data representing a distance to the object using the corrected light field data.

17. The information processing apparatus according to claim 1, wherein the correcting applies a filter on the light field data.

18. The information processing apparatus according to claim 1, wherein the generating extracts two-dimensional frequency characteristic data of the light field data and performs inverse Fourier transform.

19. A non-transitory computer readable medium that contains a program for causing a computer to function as the information processing apparatus set forth in claim 1.

* * * * *